United States Patent
Lu et al.

(10) Patent No.: US 10,305,572 B2
(45) Date of Patent: May 28, 2019

(54) INFORMATION TRANSMISSION METHOD, ACCESS POINT, AND USER EQUIPMENT

(71) Applicant: HUAWEI TECHNOLOGIES CO., LTD., Shenzhen, Guangdong (CN)

(72) Inventors: Weishan Lu, Shenzhen (CN); Jian Yu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/587,470

(22) Filed: May 5, 2017

(65) Prior Publication Data

US 2017/0244466 A1 Aug. 24, 2017

Related U.S. Application Data

(63) Continuation of application No. PCT/CN2014/090533, filed on Nov. 7, 2014.

(51) Int. Cl.
*H04B 7/08* (2006.01)
*H04L 1/00* (2006.01)
(Continued)

(52) U.S. Cl.
CPC ............. *H04B 7/08* (2013.01); *H04L 5/0048* (2013.01); *H04L 5/0064* (2013.01);
(Continued)

(58) Field of Classification Search
CPC .... H04L 5/0023; H04L 5/0091; H04B 7/0452
See application file for complete search history.

(56) References Cited

U.S. PATENT DOCUMENTS

| 8,638,746 B2 | 1/2014 | Papadopoulos et al. |
| 2009/0122882 A1 | 5/2009 | Mujtaba |

(Continued)

FOREIGN PATENT DOCUMENTS

| CN | 101237306 A | 8/2008 |
| CN | 102857284 A | 1/2013 |

(Continued)

OTHER PUBLICATIONS

International Search Report dated Jul. 17, 2015 in corresponding International Patent Application No. PCT/CN2014/090533.

(Continued)

*Primary Examiner* — Ross Varndell
(74) *Attorney, Agent, or Firm* — Staas & Halsey LLP

(57) ABSTRACT

A method includes: determining a maximum orthogonal frequency division multiplexing OFDM symbol quantity of a frequency band used for downlink transmission, where the maximum OFDM symbol quantity of the frequency band is a maximum value of maximum OFDM symbol quantities of all subbands of the frequency band; determining, according to a value relationship between a maximum OFDM symbol quantity of a subband to which user equipment belongs and the maximum OFDM symbol quantity of the frequency band, additional long training field instruction information used to instruct whether to send an additional long training field to the user equipment; and sending an indication message to the user equipment, where the indication message includes the additional long training field instruction information.

4 Claims, 19 Drawing Sheets

(51) Int. Cl.
  *H04L 5/00* (2006.01)
  *H04L 27/26* (2006.01)
  *H04B 7/0452* (2017.01)

(52) U.S. Cl.
  CPC ............ *H04L 5/0091* (2013.01); *H04L 27/26* (2013.01); *H04L 27/2613* (2013.01); *H04L 27/2626* (2013.01); *H04B 7/0452* (2013.01); *H04L 1/0031* (2013.01); *H04L 5/0023* (2013.01)

(56) References Cited

U.S. PATENT DOCUMENTS

| | | |
|---|---|---|
| 2012/0120907 A1 | 5/2012 | Kishigami |
| 2012/0207097 A1 | 8/2012 | Lee et al. |
| 2012/0263158 A1 | 10/2012 | Lee et al. |
| 2013/0114757 A1* | 5/2013 | Park .................... H04L 27/2613 375/295 |
| 2013/0121244 A1 | 5/2013 | Vermani et al. |
| 2013/0121245 A1 | 5/2013 | Vermani et al. |
| 2013/0128807 A1 | 5/2013 | Vermani et al. |
| 2013/0128935 A1 | 5/2013 | Janani et al. |
| 2013/0177090 A1 | 7/2013 | Yang et al. |
| 2013/0286959 A1 | 10/2013 | Lou et al. |
| 2014/0328430 A1 | 11/2014 | Park et al. |
| 2016/0100381 A1* | 4/2016 | Li ........................ H04L 5/0044 370/329 |
| 2016/0277543 A1 | 9/2016 | Vermani et al. |

FOREIGN PATENT DOCUMENTS

| | | |
|---|---|---|
| CN | 103986682 A | 8/2014 |
| EP | 3151497 A1 | 4/2017 |
| JP | 2013-509794 | 3/2013 |
| JP | 2014515570 A | 6/2014 |
| JP | 2014517608 A | 7/2014 |
| JP | 2014519266 A | 8/2014 |
| JP | 2014519268 A | 8/2014 |
| KR | 1020110048017 A | 5/2011 |
| KR | 1020110048018 A | 5/2011 |
| WO | 2011010433 A1 | 1/2011 |

OTHER PUBLICATIONS

Extended European Search Report dated Aug. 24, 2017 in corresponding European Patent Application No. 14905506.3.
Hongyuan Zhang (Marvell) et al.: "11ah Padding," IEEE SA Mentor, Piscataway, NJ USA, vol. 802.11ah, Jul. 16, 2012, pp. 1-11, XP068039337.
"IEEE Standard for Information technology—Telecommunications and information exchange between systems—Local and metropolitan area networks—Specific requirements, Part 11: wireless LAN Medium Access Control (MAC) and Physical Layer (PHY) Specifications, Amendment 5: enhancements for Higher Throughput," IEEE Computer Society, IEEE Std 802.11 n—2009, Oct. 29, 2009.
"Part 11: Wireless LAN Medium Access Control (MAC) and Physical Layer (PHY) Specifications, Amendment 4: Enhancements for Very High Throughput for Operation in Bands below 6 GHz," IEEE Computer Society, IEEE Std 802.11ac-2013, 2013.
Singaporean Search Report dated Oct. 23, 2017 in corresponding Singaporean Patent Application No. 11201703603X.
Singaporean Written Opinion dated Oct. 23, 2017 in corresponding Singaporean Patent Application No. 11201703603X.
International Search Report dated Jul. 17, 2015, in corresponding International Application No. PCT/CN2014/090533.
Japanese Office Action dated Jun. 4, 2018, in corresponding Japanese Patent Application No. 2017-524384, 6 pgs.
Notice of Allowance, dated Sep. 19, 2018, in Japanese Application No. 2017524384 (3 pp.).
Notice of Preliminary Rejection, dated Jan. 23, 2019 (9 pp.).

\* cited by examiner

100

```
┌─────────────────────────────────────────────────────┐
│ Determine a maximum orthogonal frequency division   │
│ multiplexing OFDM symbol quantity of a frequency    │      S110
│ band used for downlink transmission, where the      │
│ maximum OFDM symbol quantity of the frequency       │
│ band is a maximum value of maximum OFDM symbol      │
│ quantities of all subbands of the frequency band    │
└─────────────────────────────────────────────────────┘
                          │
┌─────────────────────────────────────────────────────┐
│ Additional long training field instruction          │      S120
│ information instructs to send an additional long    │
│ training field to user equipment                    │
└─────────────────────────────────────────────────────┘
                          │
┌─────────────────────────────────────────────────────┐
│ Determine a target quantity of OFDM symbols used    │
│ for sending the additional long training field to   │
│ the user equipment, where the target quantity of    │      S140
│ OFDM symbols is less than or equal to a difference  │
│ between the maximum OFDM symbol quantity of the     │
│ frequency band and a maximum OFDM symbol quantity   │
│ of a subband to which the user equipment belongs    │
└─────────────────────────────────────────────────────┘
                          │
┌─────────────────────────────────────────────────────┐
│ Send an indication message to the user equipment,   │
│ where the indication message includes the           │      S130
│ additional long training field instruction          │
│ information, and the additional long training field │
│ instruction information includes the target         │
│ quantity of OFDM symbols                            │
└─────────────────────────────────────────────────────┘
```

FIG. 2

| Initial long training field | Additional long training field | Data field |
|---|---|---|

FIG. 4

| Initial long training field | First additional long training field | First data field | Second additional long training field | Second data field |
|---|---|---|---|---|

┌─────────────────────────────────────────────────────┐
│ Determine a maximum orthogonal frequency division multiplexing │
│ OFDM symbol quantity of a frequency band used for uplink │
│ transmission, where the maximum OFDM symbol quantity of the │  S310
│ frequency band is a maximum value of maximum OFDM symbol │
│ quantities of all subbands of the frequency band │
└─────────────────────────────────────────────────────┘

┌─────────────────────────────────────────────────────┐
│ Additional long training field instruction information instructs │  S320
│ user equipment to send an additional long training field │
└─────────────────────────────────────────────────────┘

┌─────────────────────────────────────────────────────┐
│ Send an indication message to the user equipment, where the │
│ indication message includes the additional long training field │  S330
│ instruction information │
└─────────────────────────────────────────────────────┘

┌─────────────────────────────────────────────────────┐
│ Receive an uplink data packet sent by the user equipment │  S350
└─────────────────────────────────────────────────────┘

Receive an indication message sent by an access point AP, where the indication message includes additional long training field instruction information, and the additional long training field instruction information is used to instruct whether to send an additional long training field — S410

When the additional long training field instruction information instructs to send the additional long training field, determine a target quantity of OFDM symbols used for sending the additional long training field — S420

Send the additional long training field and an initial long training field to the AP according to the target quantity of OFDM symbols — S430

FIG. 13

INFORMATION TRANSMISSION METHOD, ACCESS POINT, AND USER EQUIPMENT

CROSS-REFERENCE TO RELATED APPLICATIONS

This application is a continuation of International Application No. PCT/CN2014/090533, filed on Nov. 7, 2014, the disclosure of which is hereby incorporated by reference in its entirety.

TECHNICAL FIELD

The present disclosure relates to the communications field, and more specifically, to an information transmission method, an access point, and user equipment.

BACKGROUND

In one aspect, a Multiple Input Multiple Output ("MIMO" for short) technology can provide transmit (receive) beamforming, thereby effectively improving transmit (receive) power and effectively improving reliability of a communications system. In another aspect, the MIMO technology can generate an extra spatial degree of freedom, thereby improving a system throughput manyfold and effectively increasing a rate of the communications system. Due to these advantages of the MIMO technology, the MIMO technology is a key technology in the 802.11n standard protocol. The MIMO technology in the 802.11n standard includes space time coding, beamforming, antenna selection, coherence combination, and spatial multiplexing, and supports simultaneous transmission of four data flows. Therefore, compared with the 802.11a/b/g standard, the 802.11n standard significantly improves the system throughput, and a maximum transmission rate reaches 600 Mbit/s theoretically.

To further improve the system throughput, the IEEE Union is drafting and revising the 802.11ac standard following the 802.11n standard. The standard is dedicated to a frequency band of 5 GHz, a bandwidth increases from 40 Mbit/s in the original 802.11n standard to 80 Mbit/s, and even reaches 160 Mbit/s. In addition, the 802.11ac standard supports a higher-order modulation scheme—256 quadrature amplitude modulation (Quadrature Amplitude Modulation, "QAM modulation" for short). To further improve an MIMO degree of freedom, the 802.11ac standard supports simultaneous transmission of a maximum of eight flows. Considering an asymmetrical quantity of link antennas, a downlink multi-user MIMO ("MU-MIMO" for short) technology is introduced in the 802.11ac standard, thereby effectively utilizing the MIMO degree of freedom. Because of all these advanced technologies, a throughput in the 802.11ac standard exceeds 1 Gbps.

Actually, the downlink MU-MIMO technology is a spatial multiplexing based one-to-many transmission technology. By using the downlink MU-MIMO technology, a transmit end may simultaneously transmit data to multiple receive ends or multiple users. When MIMO transmission is being performed, data of each flow needs to be aligned. When data is transmitted to multiple users, although the data transmitted to the users is not the same, the data still needs to be aligned by means of zero filling, where zero filling is zero padding, or is referred to as bit trailing. In a current technology, data of different flows is aligned by means of zero filling at a media access control (Media Access Control, "MAC" for short) layer and a physical (Physical, "PHY" for short) layer.

To further improve a throughput of a wireless local area network, and resolve problems of severe interference in a dense scenario and a low throughput rate, an uplink MU-MIMO technology and an orthogonal frequency division multiple access (Orthogonal Frequency Division Multiple Access, "OFDMA" for short) technology are to be further considered in a future Wireless Fidelity (Wireless Fidelity, "WiFi" for short) system or WiFi standard. Same as MU-MIMO, an OFDMA system requires data to be aligned by means of zero padding in a frequency domain. When both OFDMA and MU-MIMO are used, that is, MU-MIMO is performed on an OFDMA subband, zero padding needs to be first performed between different flows for data alignment, and then data alignment is performed on different subbands.

When MIMO transmission and MU-MIMO transmission are performed on an OFDMA subband, there is a great length difference between data transmitted between subbands and between flows, and more zeros need to be padded for data alignment. In this way, a waste of frequency band resources is caused; in addition, zero padding brings extra overheads. This is undesirable.

Therefore, in a data transmission process, how to reduce extra overheads caused by zero padding for data alignment and improve frequency band resource utilization is an urgent problem to be resolved.

SUMMARY

In view of this, embodiments of the present invention provide an information transmission method, an access point, and user equipment, so that extra overheads caused by zero padding for data alignment in a data transmission process can be reduced and frequency band resource utilization can be improved, and a receive end can perform more accurate channel estimation, thereby reducing a bit error rate and improving data transmission reliability.

According to a first aspect, an information transmission method is provided, including: determining a maximum orthogonal frequency division multiplexing OFDM symbol quantity of a frequency band used for downlink transmission, where the maximum OFDM symbol quantity of the frequency band is a maximum value of maximum OFDM symbol quantities of all subbands of the frequency band; determining, according to a value relationship between a maximum OFDM symbol quantity of a subband to which user equipment belongs and the maximum OFDM symbol quantity of the frequency band, additional long training field instruction information used to instruct whether to send an additional long training field to the user equipment; and sending an indication message to the user equipment, where the indication message includes the additional long training field instruction information.

According to a second aspect, an information transmission method is provided, including: receiving an indication message sent by an access point AP, where the indication message includes additional long training field instruction information, and the additional long training field instruction information is used to instruct the AP whether to send an additional long training field; when the additional long training field instruction information instructs the AP to send the additional long training field, determining a target quantity of OFDM symbols used by the AP for sending the additional long training field; receiving, according to the target quantity of OFDM symbols, the additional long training field and an initial long training field that are sent by the AP; and performing channel estimation according to the additional long training field and the initial long training field.

According to a third aspect, an information transmission method is provided, including: determining a maximum orthogonal frequency division multiplexing OFDM symbol quantity of a frequency band used for uplink transmission, where the maximum OFDM symbol quantity of the frequency band is a maximum value of maximum OFDM symbol quantities of all subbands of the frequency band; determining, according to a value relationship between a maximum OFDM symbol quantity of a subband to which user equipment belongs and the maximum OFDM symbol quantity of the frequency band, additional long training field instruction information used to instruct the user equipment whether to send an additional long training field; and sending an indication message to the user equipment, where the indication message includes the additional long training field instruction information.

According to a fourth aspect, an information transmission method is provided, including: receiving an indication message sent by an access point AP, where the indication message includes additional long training field instruction information, and the additional long training field instruction information is used to instruct user equipment whether to send an additional long training field; when the additional long training field instruction information instructs to send the additional long training field, determining a target quantity of OFDM symbols used for sending the additional long training field; and sending the additional long training field and an initial long training field to the AP according to the target quantity of OFDM symbols.

According to a fifth aspect, an access point is provided, including: a first determining module, configured to determine a maximum orthogonal frequency division multiplexing OFDM symbol quantity of a frequency band used for downlink transmission, where the maximum OFDM symbol quantity of the frequency band is a maximum value of maximum OFDM symbol quantities of all subbands of the frequency band; a second determining module, configured to determine, according to a value relationship between a maximum OFDM symbol quantity of a subband to which user equipment belongs and the maximum OFDM symbol quantity that is of the frequency band and is determined by the first determining module, additional long training field instruction information used to instruct whether to send an additional long training field to the user equipment; and a sending module, configured to send an indication message to the user equipment, where the indication message includes the additional long training field instruction information determined by the second determining module.

According to a sixth aspect, user equipment is provided, including: a first receiving module, configured to receive an indication message sent by an access point AP, where the indication message includes additional long training field instruction information, and the additional long training field instruction information is used to instruct the AP whether to send an additional long training field; a determining module, configured to: when the additional long training field instruction information included in the indication message received by the first receiving module instructs the AP to send the additional long training field, determine a target quantity of OFDM symbols used by the AP for sending the additional long training field; a second receiving module, configured to receive, according to the target quantity of OFDM symbols that is determined by the determining module, the additional long training field and an initial long training field that are sent by the AP; and a processing module, configured to perform channel estimation according to the additional long training field and the initial long training field that are received by the second receiving module.

According to a seventh aspect, an access point is provided, including: a first determining module, configured to determine a maximum orthogonal frequency division multiplexing OFDM symbol quantity of a frequency band used for uplink transmission, where the maximum OFDM symbol quantity of the frequency band is a maximum value of maximum OFDM symbol quantities of all subbands of the frequency band; a second determining module, configured to determine, according to a value relationship between a maximum OFDM symbol quantity of a subband to which user equipment belongs and the maximum OFDM symbol quantity that is of the frequency band and is determined by the first determining module, additional long training field instruction information used to instruct the user equipment whether to send an additional long training field; and a sending module, configured to send an indication message to the user equipment, where the indication message includes the additional long training field instruction information determined by the second determining module.

According to an eighth aspect, user equipment is provided, including: a receiving module, configured to receive an indication message sent by an access point AP, where the indication message includes additional long training field instruction information, and the additional long training field instruction information is used to instruct whether to send an additional long training field; a determining module, configured to: when the additional long training field instruction information included in the indication message received by the receiving module instructs to send the additional long training field, determine a target quantity of OFDM symbols used for sending the additional long training field; and a sending module, configured to send the additional long training field and an initial long training field to the AP according to the target quantity of OFDM symbols that is determined by the determining module.

Based on the foregoing technical solutions, according to the information transmission method, the access point, and the user equipment in the embodiments of the present invention, a value relationship between a maximum OFDM symbol quantity of a subband to which user equipment belongs and a maximum OFDM symbol quantity of an entire frequency band occupied in data transmission is compared to determine whether to transmit an additional long training field in a data transmission process. Therefore, when it is determined that the additional long training field is transmitted in the data transmission process, zero padding overheads and a noise variance in the data transmission process can be reduced, and frequency band resource utilization can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2 is another schematic flowchart of an information transmission method according to an embodiment of the present invention;

FIG. 4 is a schematic block diagram of a sending time sequence of an additional long training field according to an embodiment of the present invention;

FIG. 5 is another schematic block diagram of a sending time sequence of an additional long training field according to an embodiment of the present invention;

FIG. 12 is still another schematic flowchart of an information transmission method according to still another embodiment of the present invention;

FIG. 13 is still another schematic flowchart of an information transmission method according to still another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as: a Global System for Mobile Communications ("GSM" for short), a Code Division Multiple Access ("CDMA" for short) system, Wideband Code Division Multiple Access ("WCDMA" for short), a general packet radio service ("GPRS" for short), Long Term Evolution ("LTE" for short), an LTE frequency division duplex ("FDD" for short) system, LTE time division duplex ("TDD" for short), and a Universal Mobile Telecommunications System ("UMTS" for short).

It should be understood that, the technical solutions of the present invention may be applied to an OFDMA system, for example, a wireless local area network (WLAN) system, and in particular, a Wireless Fidelity (Wireless Fidelity, "WiFi" for short) system. Certainly, the method in the embodiments of the present invention may further be applied to a system in which an OFDMA technology is combined with an MU-MIMO technology. However, the present invention is not limited thereto.

It should be understood that, in the embodiments of the present invention, an access point AP may provide an access service for user equipment, and the AP may be an access point in WLAN, may be a base transceiver station ("BTS" for short) in GSM or CDMA, may be a NodeB (NodeB) in WCDMA, or may be an evolved NodeB ("eNB" or "e-NodeB" for short) in LTE. This is not limited in the present invention.

It should further be understood that, in the embodiments of the present invention, user equipment may be referred to as terminal equipment, a mobile station ("MS" for short), a mobile terminal, or the like. The user equipment may communicate with one or more core networks by using a radio access network ("RAN" for short). For example, the user equipment may be a mobile phone (or referred to as a "cellular" phone) or a computer with a mobile terminal. For example, the terminal equipment may be a station (Station) in a wireless communications system.

Figure 1:
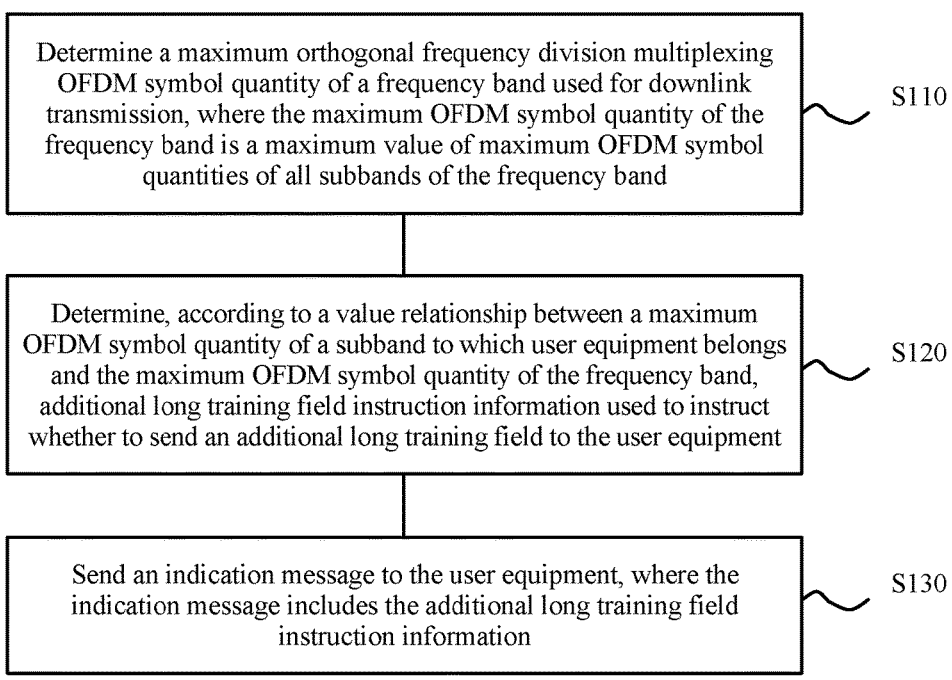
FIG. 1 is a schematic flowchart of an information transmission method according to an embodiment of the present invention.

FIG. 1 shows a schematic flowchart of an information transmission method 100 according to an embodiment of the present invention, and the method 100 may be executed by an access point. As shown in FIG. 1, the method 100 includes the following steps:

S110. Determine a maximum orthogonal frequency division multiplexing OFDM symbol quantity of a frequency band used for downlink transmission, where the maximum OFDM symbol quantity of the frequency band is a maximum value of maximum OFDM symbol quantities of all subbands of the frequency band.

S120. Determine, according to a value relationship between a maximum OFDM symbol quantity of a subband to which user equipment belongs and the maximum OFDM symbol quantity of the frequency band, additional long training field instruction information used to instruct whether to send an additional long training field to the user equipment.

S130. Send an indication message to the user equipment, where the indication message includes the additional long training field instruction information.

Specifically, the access point AP compares the maximum OFDM symbol quantities of all the subbands of the frequency band used for downlink transmission, to obtain the maximum OFDM symbol quantity corresponding to the frequency band, and then compares the value relationship between the maximum OFDM symbol quantity of the subband to which the user equipment belongs and the maximum OFDM symbol quantity of the frequency band, to determine the additional long training field instruction information, where the additional long training field instruction information is used to instruct the AP whether to send the additional long training field to the user equipment. Then, the AP sends the indication message that includes the additional long training field instruction information to the user equipment.

In conclusion, according to the information transmission method in this embodiment of the present invention, an AP determines, according to a value relationship between a maximum OFDM symbol quantity of a subband to which user equipment belongs and a maximum OFDM symbol quantity of a frequency band used for downlink transmission, whether to send an additional long training field to the user equipment. Therefore, when the AP determines to send the additional long training field to the user equipment, zero padding overheads and a noise variance in a data transmission process can be reduced, and frequency band resource utilization can be improved. The user equipment can perform more accurate channel estimation according to the additional long training field, thereby reducing a bit error rate and improving data transmission reliability.

It should be understood that, in this embodiment of the present invention, the maximum orthogonal frequency division multiplexing OFDM symbol quantity of the frequency band used for downlink transmission may be a maximum value of a quantity of OFDM symbols required by the AP for sending, on a frequency band occupied in a downlink transmission process, a preamble field and a data field to the user equipment, and the preamble field may include an initial long training field and/or a signaling field and/or a short training field. Alternatively, the maximum OFDM symbol quantity of the frequency band used for downlink transmission may be a maximum value of a quantity of OFDM symbols required by the AP for sending, on a frequency band occupied in a downlink transmission process, a data field to the user equipment, or the maximum OFDM symbol quantity of the frequency band used for downlink transmission may be a maximum value of a quantity of OFDM symbols required by the AP for sending, on a frequency band occupied in a downlink transmission process, another field to the user equipment. This is not limited in the present invention.

It should be understood that, in this embodiment of the present invention, the maximum OFDM symbol quantity of the subband to which the user equipment belongs may be a maximum value of a quantity of OFDM symbols required by the AP for sending, on the subband to which the user equipment belongs, a preamble field and a data field to the user equipment, and the preamble field may include an initial long training field and/or a signaling field and/or a short training field. Alternatively, the maximum OFDM symbol quantity of the subband to which the user equipment belongs may be a maximum value of a quantity of OFDM symbols required by the AP for sending, on the subband to which the user equipment belongs, a data field to the user equipment, or the maximum OFDM symbol quantity of the subband to which the user equipment belongs may be a maximum value of a quantity of OFDM symbols required by the AP for sending, on the subband to which the user equipment belongs, another field to the user equipment. This is not limited in the present invention.

It should be understood that, in this embodiment of the present invention, each subband may be occupied by one or more user equipments. Quantities of OFDM symbols used by the AP for sending an initial long training field to one or more user equipments on a same subband are the same, and quantities of OFDM symbols used by the AP for sending an initial long training field to one or more user equipments on different subbands may be the same or different.

It should further be understood that, in this embodiment of the present invention, the initial long training field refers to a long training field that is supposed to be sent by the AP according to a standard and is used by the user equipment for performing channel estimation. The additional long training field refers to an extra long training field sent by the AP to the user equipment in addition to an initial long training field.

Specifically, in S110, the AP may determine, according to the maximum quantity of OFDM symbols used by the AP for sending the data field to the user equipment in the downlink transmission process and a quantity of spatial-temporal flows corresponding to each subband of the frequency band used for downlink transmission, the maximum OFDM symbol quantity of the frequency band used for downlink transmission, or may determine, according to other information, the maximum OFDM symbol quantity of the frequency band used for downlink transmission. This is not limited in the present invention.

In this embodiment of the present invention, optionally, the AP may determine, according to a frame length and a coding scheme of downlink transmission data and a quantity of data bits included in an OFDM symbol in each subband of the frequency band used for downlink transmission, a quantity of OFDM symbols used by the AP for sending the data field to the user equipment, and then obtain, by means of comparison, the maximum quantity of OFDM symbols used by the AP for sending the data field to the user equipment.

Specifically, in this embodiment of the present invention, the AP may determine, according to formula (1), the quantity of OFDM symbols used for sending the data field to the user equipment.

$$N_{SYM\_init,u}^{(k)} = \begin{cases} \left\lceil \dfrac{8 \cdot APEP\_LENGTH_u + N_{service} + N_{tail} \cdot N_{ES,u}}{N_{DBPSR,u}^{(k)}} \right\rceil & BCC \\ \left\lceil \dfrac{8 \cdot APEP\_LENGTH_u + N_{service}}{N_{DBPSR,u}^{(k)}} \right\rceil & LDPC \end{cases} \quad (1)$$

k represents a sequence number of a subband of the frequency band used for downlink transmission, $N_{SYM\_init,u}^{(k)}$ represents a quantity of OFDM symbols used by the AP for sending, on a subband with a sequence number k, a data field to user equipment u on the subband, APEP_LENGTH$_u$ is a length of a data frame corresponding to the data field, and N$_{service}$ is a quantity of fixed bits preceding the data field, and is a constant in a stipulated standard protocol. For example, a value of N$_{service}$ is 16 in an 802.11ac system. N$_{tail}$ represents a quantity of tail bits for enabling binary convolutional code (binary convolutional code, "BCC" for short) to return to a zero state, and is a constant in a stipulated standard protocol. For example, a value of N$_{tail}$ is 6 in the 802.11ac system. N$_{ES,u}$ is a quantity of BCC coders of the user equipment u. $N_{DBPSR,u}^{(k)}$ is a quantity of data bits included in each OFDM symbol (Data Bits per OFDM Symbol) in the subband with the sequence number k, and may be obtained by calculating a modulation and coding scheme (Modulation and Coding Scheme, "MCS" for short) indication parameter, a spatial-temporal flow quantity indication parameter, and the like. ⌈ ⌉ represents rounding up. For low-density parity-check ("LDPC" for short) coding, in an 8021.11ac system, there is ambiguity in indication of an OFDM symbol quantity due to use of a guard interval ("short GI" for short). Therefore, a short guard interval symbol quantity disambiguation indicator bit and a low-density parity-check extra symbol (LDPC Extra OFDM Symbol) indicator bit in a signaling field are used for assisting in symbol quantity disambiguation. Therefore, for LDPC coding, $N_{SYM\_init,u}^{(k)}$ represents a symbol quantity obtained after disambiguation. The AP may also determine, in another manner, the quantity of OFDM symbols used for sending the data field to the user equipment. This is not limited in the present invention.

Specifically, in S120, the AP determines the additional long training field instruction information when the AP determines that the maximum OFDM symbol quantity of the subband to which the user equipment belongs is less than the maximum OFDM symbol quantity of the frequency band, where the additional long training field instruction information is used to instruct the AP to send the additional long training field to the user equipment. The AP sends the additional long training field and an initial long training field to the user equipment according to the additional long training field instruction information.

The AP determines the additional long training field instruction information when the AP determines that the maximum OFDM symbol quantity of the subband to which the user equipment belongs is equal to the maximum OFDM symbol quantity of the frequency band, where the additional long training field instruction information is used to instruct the AP not to send the additional long training field to the user equipment.

Optionally, FIG. 2 shows another schematic flowchart of the information transmission method 100 according to an embodiment of the present invention. As shown in FIG. 2, the method 100 further includes the following step:

S140. Determine a target quantity of OFDM symbols used for sending the additional long training field to the user equipment, where the target quantity of OFDM symbols is less than or equal to a difference between the maximum OFDM symbol quantity of the frequency band and the maximum OFDM symbol quantity of the subband to which the user equipment belongs.

Correspondingly, in S130, the AP sends the indication message to the user equipment, where the indication message includes the additional long training field instruction information, and the additional long training field instruction information includes the target quantity of OFDM symbols.

Figure 3:
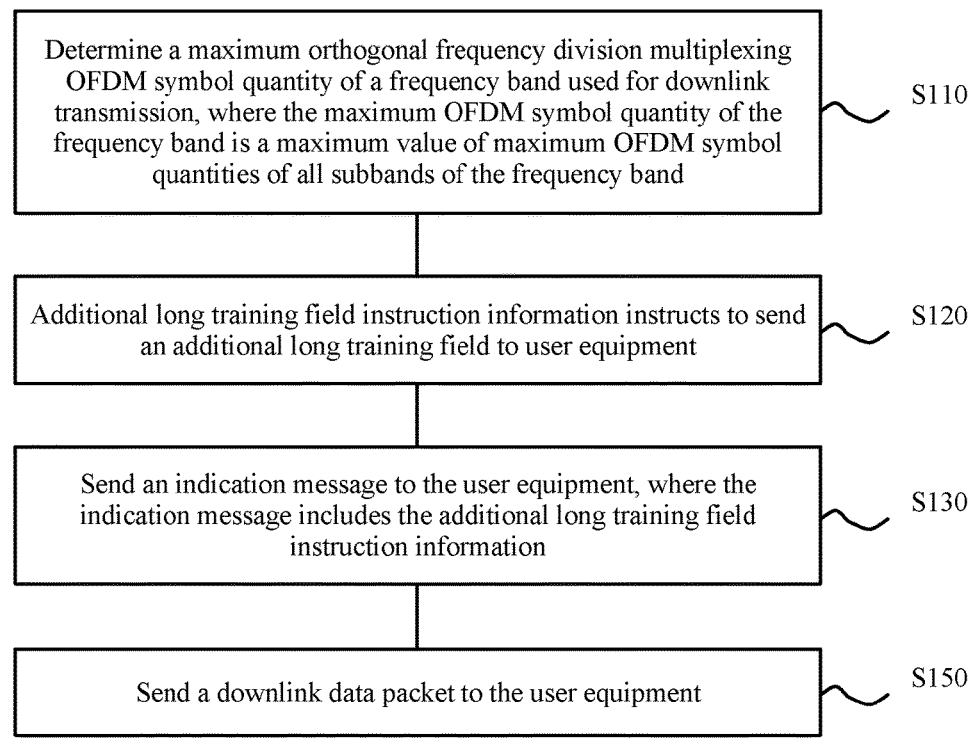
FIG. 3 is still another schematic flowchart of an information transmission method according to an embodiment of the present invention.

Optionally, FIG. 3 shows still another schematic flowchart of the information transmission method 100 according to an embodiment of the present invention. As shown in FIG. 3, the method 100 further includes the following step:

S150. Send a downlink data packet to the user equipment.

Optionally, in S150, as shown in FIG. 4, the downlink data packet includes an initial long training field, an additional long training field, and a data field that are arranged according to a sending time sequence. A sum of a quantity of OFDM symbols used by the AP for sending the initial long training field and a target quantity of OFDM symbols used for sending the additional long training field is less than or equal to a preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

Optionally, in S150, as shown in FIG. 5, the downlink data packet includes the first additional long training field, the first data field, the second additional long training field, the second data field, . . . , the i$^{th}$ additional long training field, the i$^{th}$ data field, . . . , the M$^{th}$ additional long training field, and the M$^{th}$ data field that are arranged according to a sending time sequence, where 1≤i≤M, M is a natural number greater than 1, and i is a natural number.

The additional long training field includes the first additional long training field to the M$^{th}$ additional long training field, a sum of a quantity of OFDM symbols used by the AP for sending the first additional long training field and a quantity of OFDM symbols used for sending the initial long training field is less than or equal to a preset threshold, and a quantity of OFDM symbols used by the AP for sending any additional long training field of the second additional long training field to the M$^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

It should be understood that, in this embodiment of the present invention, the downlink data packet may further include a signaling field and/or a short training field and/or another field that is supposed to be included according to a standard. This is not limited in the present invention.

In this embodiment of the present invention, optionally, a quantity of OFDM symbols used by the AP for sending any additional long training field of the M additional long training fields may be the same or different, and a quantity of OFDM symbols used by the AP for sending any data field of the M data fields may be the same or different. This is not limited in the present invention.

Specifically, in this embodiment of the present invention, the AP may determine a value of M according to formula (2):

$$M_{parts,LTF} \leq floor\left(\frac{N_{ori\_LTF,RB} + N_{Ex\_LTF,RB}}{N_{ori\_LTF,RB}}\right) \quad (2)$$

$M_{parts,LTF}$ represents the value of M, $N_{ori\_LTF,RB}$ represents a quantity of OFDM symbols used by the AP for sending, on each subband, an initial long training field to the user equipment, $N_{Ex\_LTF,RB}$ represents a quantity of OFDM symbols used by the AP for sending, on each subband, an additional long training field to the user equipment, and a floor function represents rounding down.

In this embodiment of the present invention, optionally, a sum of the quantity $N_{Ex\_LTF,RB}$ of OFDM symbols used by the AP for sending the M additional long training fields to the user equipment and the quantity $N_{ori\_LTF,RB}$ of OFDM symbols used for sending the initial long training field may be approximately evenly divided into M parts. That is, a quantity of OFDM symbols used by the AP for sending the first additional long training field of first mod($N_{ori\_LTF,RB}$+$N_{Ex\_LTF,RB}$,$M_{parts,LTF}$) additional long training fields to the user equipment is $$floor\left(\frac{N_{ori\_LTF,RB} + N_{Ex\_LTF,RB}}{M_{parts,LTF}}\right) - N_{ori\_LTF,RB} + 1,$$

a quantity of OFDM symbols used by the AP for sending any additional long training field of the first mod($N_{ori\_LTF,RB}$+$N_{Ex\_LTF,RB}$,$M_{parts,LTF}$) additional long training fields except the first additional long training field is $$floor\left(\frac{N_{ori\_LTF,RB} + N_{Ex\_LTF,RB}}{M_{parts,LTF}}\right) + 1,$$

and a quantity of OFDM symbols used by the AP for sending any additional long training field of the M additional long training fields except the first mod($N_{ori\_LTF,RB}$+$N_{Ex\_LTF,RB}$, $M_{parts,LTF}$) additional long training fields is $$floor\left(\frac{N_{ori\_LTF,RB} + N_{Ex\_LTF,RB}}{M_{parts,LTF}}\right).$$

The sum of the quantity of OFDM symbols used by the AP for sending the initial long training field and the quantity of OFDM symbols used for sending the first additional long training field is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

In this embodiment of the present invention, alternatively, the quantity of OFDM symbols used by the AP for sending the first additional long training field may be preferentially allocated, and a quantity of OFDM symbols used by the AP for sending any additional long training field of the M additional long training fields except the first additional long training field may be evenly allocated. In this case, the sum of the quantity of OFDM symbols used by the AP for sending the initial long training field and the quantity of OFDM symbols used for sending the first additional long training field is less than or equal to the preset threshold, and the quantity of OFDM symbols used by the AP for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

In this embodiment of the present invention, preferably, the quantity of OFDM symbols used by the AP for sending the additional long training field to the user equipment is equal to the difference between the maximum OFDM symbol quantity of the frequency band and the maximum OFDM symbol quantity of the subband to which the user equipment belongs, the quantity of OFDM symbols used by the AP for sending any additional long training field of the second additional long training field to the $M^{th}$ additional long training field in the M additional long training fields is $$floor\left(\frac{N_{ori\_LTF,RB} + N_{Ex\_LTF,RB}}{M_{parts,LTF}}\right),$$

and the quantity of OFDM symbols used by the AP for sending the first additional long training field is $$N_{Ex\_LTF,RB} - (M_{parts,LTF} - 1) \times floor\left(\frac{N_{ori\_LTF,RB} + N_{Ex\_LTF,RB}}{M_{parts,LTF}}\right).$$

$M_{parts,LTF}$ represents a value of M, $N_{ori\_LTF,RB}$ represents a quantity of OFDM symbols used by the AP for sending, on each subband, an initial long training field to the user equipment, $N_{Ex\_LTF,RB}$ represents a quantity of OFDM symbols used by the AP for sending, on each subband, the M additional long training fields to the user equipment, and a floor function represents rounding down.

In this embodiment of the present invention, optionally, a quantity of OFDM symbols used by the AP for sending each data field of the M data fields may be approximately evenly allocated. That is, a quantity of OFDM symbols used by the AP for sending any data field of first mod($N_{sym,RB}$, $M_{parts,LTF,RB}$) data fields is $$\mathrm{floor}\left(\frac{N_{sym,RB}}{M_{parts,LTF,RB}}\right)+1,$$

and a quantity of OFDM symbols used for sending any data field of the M data fields except the first mod($N_{sym,RB}$, $M_{parts,LTF,RB}$) data fields is $$\mathrm{floor}\left(\frac{N_{sym,RB}}{M_{parts,LTF,RB}}\right).$$

$N_{sym,RB}$ represents a maximum value of a quantity of OFDM symbols used by the AP for sending, on each subband, a data field to the user equipment. However, the present invention is not limited thereto.

In conclusion, according to the information transmission method in this embodiment of the present invention, an AP determines, according to a value relationship between a maximum OFDM symbol quantity of a subband to which user equipment belongs and a maximum OFDM symbol quantity of a frequency band used for downlink transmission, whether to send an additional long training field to the user equipment. When determining to send the additional long training field to the user equipment, the AP may divide the additional long training field into several parts for sending, so that frequency band resource utilization can be improved, and zero padding overheads, a noise variance, and impact of a channel change in a data transmission process can be reduced. The user equipment can perform more accurate channel estimation according to the additional long training field, thereby reducing a bit error rate and improving data transmission reliability.

In this embodiment of the present invention, optionally, the method 100 further includes: determining sending time sequence indication information used for indicating a sending time sequence of the additional long training field in the downlink data packet.

Correspondingly, in S130, the AP sends the indication message to the user equipment, where the indication message further includes the sending time sequence indication information.

Optionally, in S130, the AP sends the downlink data packet that includes a signaling field to the user equipment, where the signaling field carries the indication message.

Figure 6:
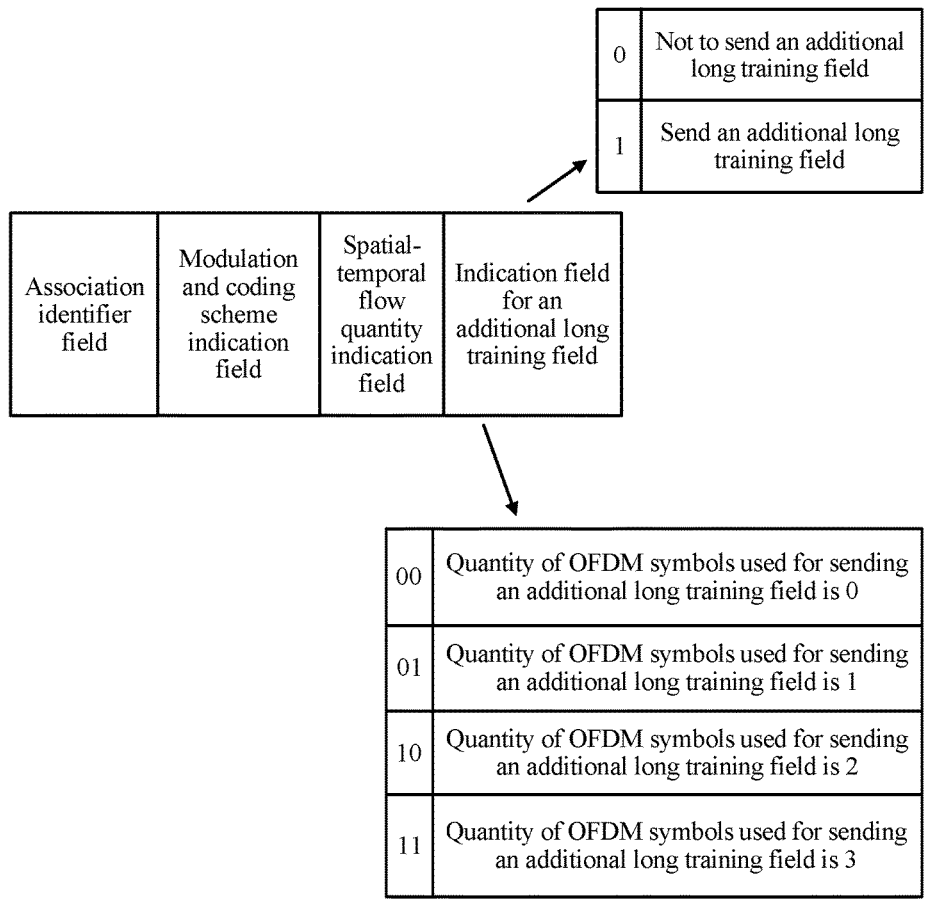
FIG. 6 is a structural block diagram of a signaling field according to an embodiment of the present invention.

In this embodiment of the present invention, optionally, the signaling field includes an indication field for an additional long training field. As shown in FIG. 6, the indication field for an additional long training field may include different quantities of bits. According to indication information of the indication field for an additional long training field, it may be determined whether the AP sends an additional long training field to the user equipment, or when the AP sends an additional long training field, a quantity of OFDM symbols used for sending the additional long training field may be determined.

Specifically, in this embodiment of the present invention, the indication field for an additional long training field may include one bit, where "1" instructs to send an additional long training field to the user equipment, and "0" instructs not to send an additional long training field to the user equipment; or "0" instructs to send an additional long training field to the user equipment, and "1" instructs not to send an additional long training field to the user equipment. Alternatively, the indication field for an additional long training field may include two bits, where "00" instructs not to send an additional long training field to the user equipment, "01" instructs to send an additional long training field to the user equipment, and "10" and "11" are reserved fields; or "00" instructs not to send an additional long training field to the user equipment, and "01", "10", and "11" all instruct to send an additional long training field to the user equipment. However, the present invention is not limited thereto.

The indication field for an additional long training field may include two bits, where "00" instructs the AP not to send an additional long training field to the user equipment; "01" instructs the AP to send an additional long training field to the user equipment, and indicates that a quantity of OFDM symbols used for sending the additional long training field is 1; "10" instructs the AP to send an additional long training field to the user equipment, and indicates that a quantity of OFDM symbols used for sending the additional long training field to the user equipment is 2; and "11" instructs the AP to send an additional long training field to the user equipment, and indicates that a quantity of OFDM symbols used for sending the additional long training field to the user equipment is 3. If a quantity of OFDM symbols used by the AP for sending an additional long training field to the user equipment is larger, the indication field for an additional long training field may include more bits. For example, the indication field for an additional long training field may be three bits. However, the present invention is not limited thereto.

Figure 7:
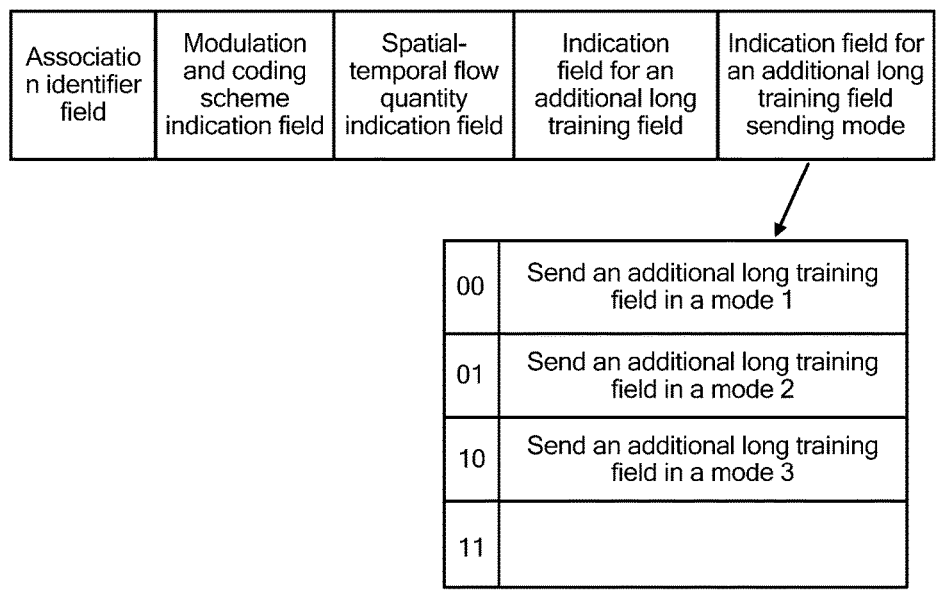
FIG. 7 is another structural block diagram of a signaling field according to an embodiment of the present invention.

In this embodiment of the present invention, optionally, the signaling field further includes an indication field for an additional long training field sending mode. As shown in FIG. 7, the indication field for an additional long training field sending mode may include different quantities of bits, and may indicate a sending mode of an additional long training field, that is, a sending time sequence of an additional long training field in a downlink data packet. The indication field for an additional long training field sending mode may include two bits, where "00" instructs to send an additional long training field in a mode 1, "01" instructs to send an additional long training field in a mode 2, "10" instructs to send an additional long training field in a mode 3, and "11" is a reserved field. Alternatively, the indication field for an additional long training field sending mode may include one bit, where "0" instructs to send an additional long training field in a mode 1, and "1" instructs to send an additional long training field in a mode 2. The modes 1, 2, and 3 are corresponding to different sending time sequences of the additional long training field in the downlink data packet in this embodiment of the present invention. However, the present invention is not limited thereto.

It should be understood that, in this embodiment of the present invention, when Multiple Input Multiple Output MIMO transmission is performed, for any subcarrier, a channel matrix is multiplied by an orthogonal mapping matrix, that is, a P matrix, to distinguish spatial-temporal flows. It is assumed that the AP sends N spatial-temporal flows to the user equipment, and the quantity of OFDM symbols used for sending the initial long training field to the user equipment is N. Considering frame alignment, the quantity of OFDM symbols used by the AP for sending the additional long training field to the user equipment is S. In this case, in a data transmission process, a channel matrix of the N+S OFDM symbols needs to be multiplied by the P matrix. When N+S≤4, the P matrix is selected from a matrix (01); when N+S is equal to 5 or 6, the P matrix is selected from a matrix (02); when N+S is equal to 7 or 8, the P matrix is selected from a matrix (03), and a size of the P matrix is selected according to a size of N*(N+S).

$$P_{VHTLTF,4\times4} = \begin{pmatrix} 1 & -1 & 1 & 1 \\ 1 & 1 & -1 & 1 \\ 1 & 1 & 1 & -1 \\ -1 & 1 & 1 & 1 \end{pmatrix} \quad (01)$$

$$P_{VHTLTF,6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$

$$w = \exp(-j2\pi/6) \quad (02)$$

$$P_{VHTLTF,8\times8} = \begin{bmatrix} P_{VHTLTF,4\times4} & P_{VHTLTF,4\times4} \\ P_{VHTLTF,4\times4} & -P_{VHTLTF,4\times4} \end{bmatrix} \quad (03)$$

Specifically, in this embodiment of the present invention, it is assumed that the quantity of OFDM symbols used by the AP for sending the initial long training field to the user equipment is 2. According to a frame alignment principle, the quantity of OFDM symbols used by the AP for sending the additional long training field to the user equipment is 2, and in this case, $$[Y_{t_1}\ Y_{t_2}\ Y_{t_3}\ Y_{t_4}]_x = \begin{bmatrix} h_{11} & h_{12} \\ h_{21} & h_{22} \end{bmatrix} \begin{bmatrix} 1 & -1 & 1 & 1 \\ 1 & 1 & -1 & 1 \end{bmatrix} LTF_x + \quad (3)$$
$$[N_{t_1}\ N_{t_2}\ N_{t_3}\ N_{t_4}]_x$$

$$[Y_{t_1}\ Y_{t_2}\ Y_{t_3}\ Y_{t_4}]_x * \begin{bmatrix} 1 & 1 \\ -1 & 1 \\ 1 & -1 \\ 1 & 1 \end{bmatrix} \quad (4)$$

$$\frac{1}{4} = \begin{bmatrix} h_{11} & h_{12} \\ h_{21} & h_{22} \end{bmatrix} LTF_x + [N_{t_1}\ N_{t_2}\ N_{t_3}\ N_{t_4}]_x \begin{bmatrix} 1 & 1 \\ -1 & 1 \\ 1 & -1 \\ 1 & 1 \end{bmatrix} * \frac{1}{4}$$

$$Y_{t_1} = \begin{bmatrix} y_{t_1 i} \\ y_{t_2 i} \end{bmatrix} \text{ and } N_{T_1} = \begin{bmatrix} n_{t_1 i} \\ n_{t_2 i} \end{bmatrix}$$

represent a receive signal and noise respectively. Further, it may be concluded that:

$$[N_{t_1}\ N_{t_2}\ N_{t_3}\ N_{t_4}]_x \begin{bmatrix} 1 & 1 \\ -1 & 1 \\ 1 & -1 \\ 1 & 1 \end{bmatrix} * \frac{1}{4} = \begin{bmatrix} n_{11} - n_{12} + n_{13} + n_{14} \\ n_{21} + n_{22} - n_{23} + n_{24} \end{bmatrix} * \frac{1}{4} \quad (5)$$

It is assumed that noise power of $n_{ti}$ is $\sigma^2$. It may be learned that a noise variance is half of an original noise variance, and is decreased by 3 dB.

In conclusion, according to the information transmission method in this embodiment of the present invention, an AP determines, according to a value relationship between a maximum OFDM symbol quantity of a subband to which user equipment belongs and a maximum OFDM symbol quantity of a frequency band used for downlink transmission, whether to send an additional long training field to the user equipment. When determining to send the additional long training field to the user equipment, the AP may divide the additional long training field into several parts for sending, so that frequency band resource utilization can be improved, and zero padding overheads, a noise variance, and impact of a channel change in a data transmission process can be reduced. The user equipment can perform more accurate channel estimation according to the additional long training field, thereby reducing a bit error rate and improving data transmission reliability.

Figure 8:
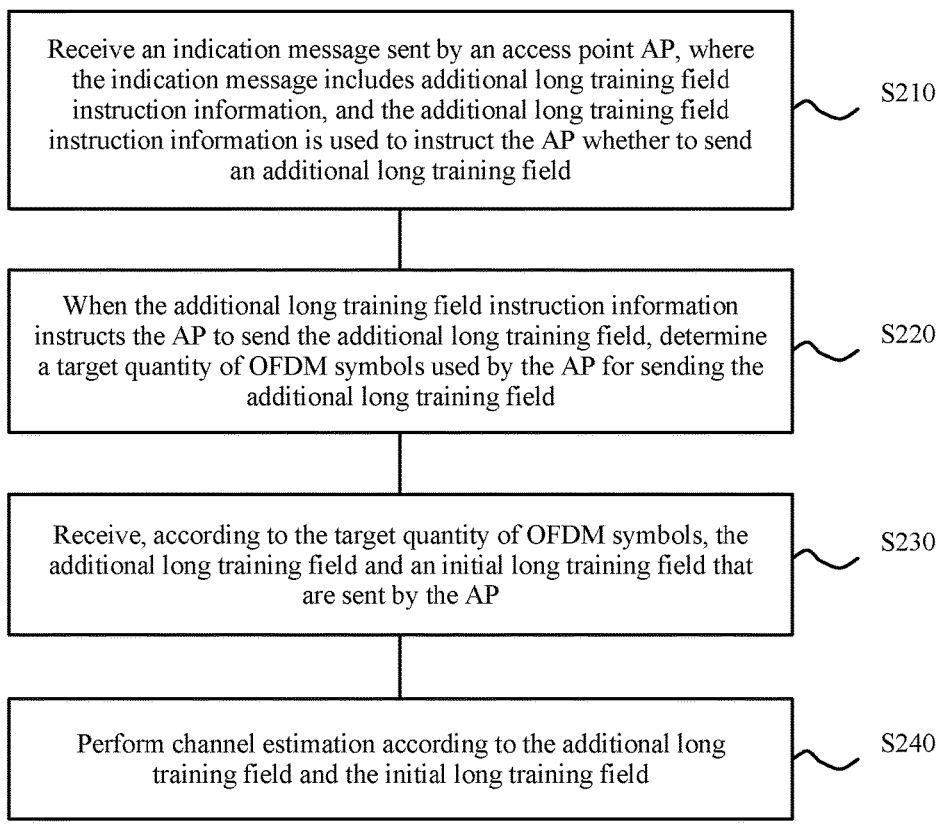
FIG. 8 is a schematic flowchart of an information transmission method according to another embodiment of the present invention.
Figure 9:
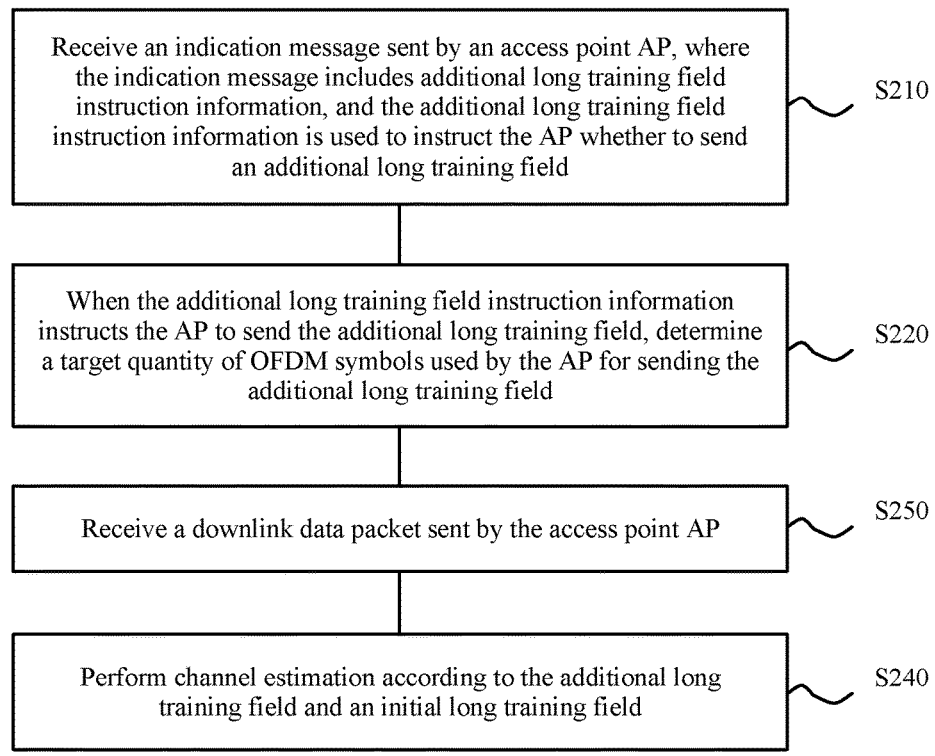
FIG. 9 is another schematic flowchart of an information transmission method according to another embodiment of the present invention.

With reference to FIG. 1 to FIG. 7, from a perspective of an access point, the foregoing describes in detail the information transmission method 100 provided in this embodiment of the present invention. With reference to FIG. 8 and FIG. 9, from a perspective of user equipment, the following describes in detail an information transmission method 200 provided in an embodiment of the present invention.

FIG. 8 shows a schematic flowchart of an information transmission method 200 according to an embodiment of the present invention, and the method 200 may be executed by user equipment. As shown in FIG. 8, the method 200 includes the following steps:

S210. Receive an indication message sent by an access point AP, where the indication message includes additional long training field instruction information, and the additional long training field instruction information is used to instruct the AP whether to send an additional long training field.

S220. When the additional long training field instruction information instructs the AP to send the additional long training field, determine a target quantity of OFDM symbols used by the AP for sending the additional long training field.

S230. Receive, according to the target quantity of OFDM symbols, the additional long training field and an initial long training field that are sent by the AP.

S240. Perform channel estimation according to the additional long training field and the initial long training field.

Specifically, the user equipment receives the indication message that includes the additional long training field instruction information and is sent by the access point AP, where the additional long training field instruction information is used to instruct the AP whether to send the additional long training field to the user equipment. When determining that the additional long training field instruction information instructs the AP to send the additional long training field, the user equipment determines the target quantity of OFDM symbols used by the AP for sending the additional long training field, receives, according to the target quantity of OFDM symbols, the additional long training field and the initial long training field that are sent by the AP, and then performs channel estimation according to the additional long training field and the initial long training field.

In conclusion, according to the information transmission method in this embodiment of the present invention, user equipment determines, according to additional long training field instruction information in a received indication message, whether an AP sends an additional long training field. Therefore, when it is determined that the AP sends the additional long training field, frequency band resource utilization can be improved, and zero padding overheads and a noise variance in a data transmission process can be reduced. The user equipment can perform more accurate channel estimation by using the additional long training field, thereby reducing a bit error rate and improving data transmission reliability.

Optionally, in S210, the additional long training field instruction information includes a target quantity of OFDM symbols used by the AP for sending the additional long training field. Correspondingly, in S220, the user equipment determines the target quantity that is of OFDM symbols used by the AP for sending the additional long training field and is included in the additional long training field instruction information as the target quantity of OFDM symbols used by the AP for sending the additional long training field.

Optionally, in S210, the indication message further includes sending time sequence indication information, and the sending time sequence indication information is used to indicate a sending time sequence of the additional long training field in a downlink data packet. Correspondingly, in S240, the user equipment performs channel estimation according to the additional long training field, the initial long training field, and the sending time sequence that is of the additional long training field in the downlink data packet and is indicated by the sending time sequence indication information.

FIG. 9 shows another schematic flowchart of the information transmission method 200 according to an embodiment of the present invention. As shown in FIG. 9, the method 200 further includes the following step:

S250. Receive a downlink data packet sent by the access point AP.

Optionally, in S250, as shown in FIG. 4, the downlink data packet includes an initial long training field, an additional long training field, and a data field that are arranged according to a sending time sequence. A sum of a quantity of OFDM symbols used by the AP for sending the initial long training field and a target quantity of OFDM symbols used for sending the additional long training field is less than or equal to a preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

Optionally, in S250, as shown in FIG. 5, the downlink data packet includes the first additional long training field, the first data field, the second additional long training field, the second data field, . . . , the $i^{th}$ additional long training field, the $i^{th}$ data field, . . . , the $M^{th}$ additional long training field, and the $M^{th}$ data field that are arranged according to a sending time sequence, where 1≤i≤M, M is a natural number greater than 1, and i is a natural number.

The additional long training field includes the first additional long training field to the $M^{th}$ additional long training field, a sum of a quantity of OFDM symbols used by the AP for sending the first additional long training field and a quantity of OFDM symbols used for sending the initial long training field is less than or equal to a preset threshold, and a quantity of OFDM symbols used by the AP for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

It should be understood that, in this embodiment of the present invention, the downlink data packet may further include a signaling field and/or a short training field and/or another field that is supposed to be included according to a standard. This is not limited in the present invention.

In this embodiment of the present invention, optionally, a quantity of OFDM symbols used by the AP for sending any additional long training field of the M additional long training fields may be the same or different, and a quantity of OFDM symbols used by the AP for sending any data field of the M data fields may be the same or different. This is not limited in the present invention.

Optionally, in S210, the user equipment receives the downlink data packet that includes a signaling field and is sent by the access point, where the signaling field carries the indication message.

In this embodiment of the present invention, optionally, the signaling field includes an indication field for an additional long training field. As shown in FIG. 6, the indication field for an additional long training field may include different quantities of bits. According to indication information of the indication field for an additional long training field, the user equipment may determine whether the AP sends an additional long training field to the user equipment, or when the AP sends an additional long training field, determine a quantity of OFDM symbols used for sending the additional long training field.

Specifically, in this embodiment of the present invention, the indication field for an additional long training field may include one bit, where "1" instructs the AP to send an additional long training field to the user equipment, and "0" instructs the AP not to send an additional long training field to the user equipment; or "0" instructs the AP to send an additional long training field to the user equipment, and "1" instructs the AP not to send an additional long training field to the user equipment. Alternatively, the indication field for an additional long training field may include two bits, where "00" instructs the AP not to send an additional long training field to the user equipment, "01" instructs the AP to send an additional long training field to the user equipment, and "10" and "11" are reserved fields; or "00" instructs the AP not to send an additional long training field to the user equipment, and "01", "10", and "11" all instruct the AP to send an additional long training field to the user equipment. However, the present invention is not limited thereto.

The indication field for an additional long training field may include two bits, where "00" instructs the AP not to send an additional long training field to the user equipment; "01" instructs the AP to send an additional long training field to the user equipment, and indicates that a quantity of OFDM symbols used for sending the additional long training field is 1; "10" instructs the AP to send an additional long training field to the user equipment, and indicates that a quantity of OFDM symbols used for sending the additional long training field to the user equipment is 2; and "11" instructs the AP to send an additional long training field to the user equipment, and indicates that a quantity of OFDM symbols used for sending the additional long training field to the user equipment is 3. If a quantity of OFDM symbols used by the AP for sending an additional long training field to the user equipment is larger, the indication field for an additional long training field may include more bits. For example, the indication field for an additional long training field may be three bits. However, the present invention is not limited thereto.

In this embodiment of the present invention, optionally, the signaling field further includes an indication field for an additional long training field sending mode. As shown in FIG. 7, the indication field for an additional long training field sending mode may include different quantities of bits, and may indicate a sending mode of an additional long training field, that is, a sending time sequence of an additional long training field in a downlink data packet. The indication field for an additional long training field sending mode may include two bits, where "00" instructs to send an additional long training field in a mode 1, "01" instructs to send an additional long training field in a mode 2, "10" instructs to send an additional long training field in a mode 3, and "11" is a reserved field. Alternatively, the indication field for an additional long training field sending mode may include one bit, where "0" instructs to send an additional long training field in a mode 1, and "1" instructs to send an additional long training field in a mode 2. The modes 1, 2, and 3 are corresponding to different sending time sequences of the additional long training field in the downlink data packet in this embodiment of the present invention. However, the present invention is not limited thereto.

Optionally, in S220, when the additional long training field instruction information instructs the AP to send the additional long training field to the user equipment, the user equipment obtains a maximum OFDM symbol quantity of a frequency band used for downlink transmission and a maximum OFDM symbol quantity of a subband to which the user equipment belongs, and determines, according to the maximum OFDM symbol quantity of the frequency band and the maximum OFDM symbol quantity of the subband to which the user equipment belongs, the target quantity of OFDM symbols used by the AP for sending the additional long training field to the user equipment, where the target quantity of OFDM symbols used by the AP for sending the additional long training field to the user equipment is less than or equal to a difference between the maximum OFDM symbol quantity of the frequency band and the maximum OFDM symbol quantity of the subband to which the user equipment belongs.

In this embodiment of the present invention, optionally, the user equipment may obtain, according to indication information that is in the signaling field and is sent by the AP, the maximum OFDM symbol quantity of the frequency band used for downlink transmission and the maximum OFDM symbol quantity of the subband to which the user equipment belongs, or may obtain, in another manner, the maximum OFDM symbol quantity of the frequency band used for downlink transmission and the maximum OFDM symbol quantity of the subband to which the user equipment belongs. This is not limited in the present invention.

Optionally, in S220, when the additional long training field instruction information instructs the AP to send the additional long training field to the user equipment, the user equipment may obtain a maximum quantity of OFDM symbols used by the AP for sending an initial long training field on a frequency band used for downlink transmission and a quantity of OFDM symbols used by the AP for sending an initial long training field on a subband to which the user equipment belongs. The quantity of OFDM symbols used by the AP for sending the additional long training field is equal to a difference between the maximum quantity of OFDM symbols used by the AP for sending the initial long training field on the frequency band and the quantity of OFDM symbols used by the AP for sending the initial long training field on the subband to which the user equipment belongs. Correspondingly, when performing resource scheduling for the user equipment, the AP performs resource allocation according to remaining resources on each subband except resources occupied by the maximum quantity of OFDM symbols used for sending the initial long training field.

In conclusion, according to the information transmission method in this embodiment of the present invention, user equipment determines, according to additional long training field instruction information in a received indication message, whether an AP sends an additional long training field. Therefore, when it is determined that the AP sends the additional long training field, frequency band resource utilization can be improved, and zero padding overheads, a noise variance, and impact of a channel change in a data transmission process can be reduced. The user equipment can perform more accurate channel estimation by using the additional long training field, thereby reducing a bit error rate and improving data transmission reliability.

Figure 10:
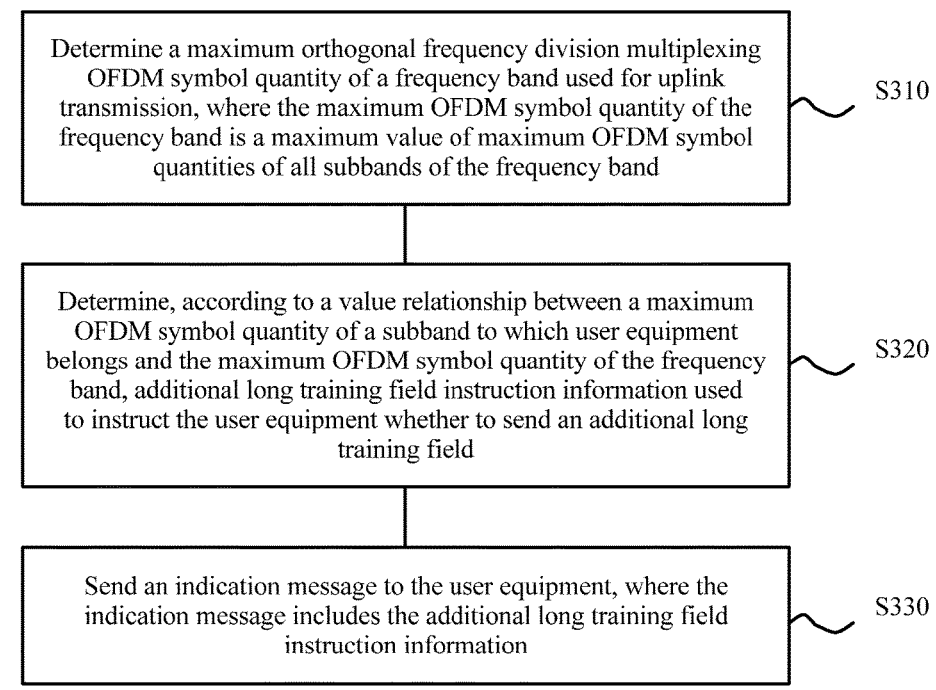
FIG. 10 is a schematic flowchart of an information transmission method according to still another embodiment of the present invention.
Figure 11:
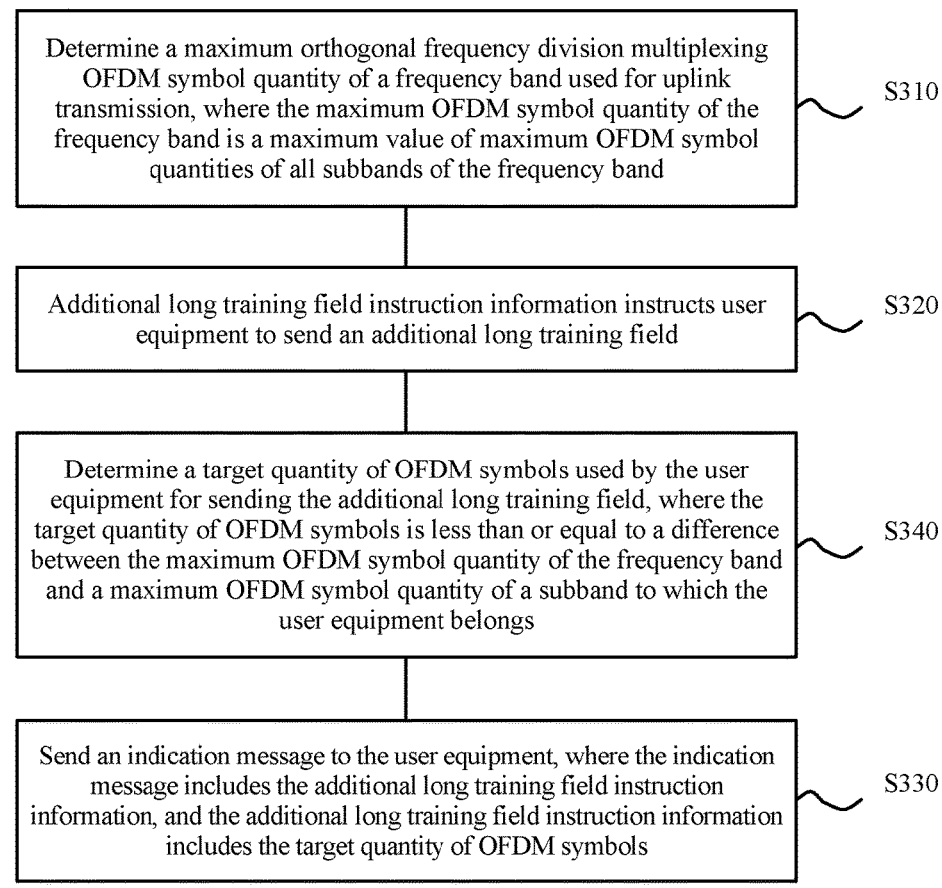
FIG. 11 is another schematic flowchart of an information transmission method according to still another embodiment of the present invention.

With reference to FIG. 10 to FIG. 12, the following describes in detail an information transmission method 300 provided in an embodiment of the present invention.

As shown in FIG. 10, FIG. 10 shows a schematic flowchart of an information transmission method 300 according to an embodiment of the present invention, and the method 300 may be executed by an access point. As shown in FIG. 10, the method 300 includes the following steps:

S310. Determine a maximum orthogonal frequency division multiplexing OFDM symbol quantity of a frequency band used for uplink transmission, where the maximum OFDM symbol quantity of the frequency band is a maximum value of maximum OFDM symbol quantities of all subbands of the frequency band.

S320. Determine, according to a value relationship between a maximum OFDM symbol quantity of a subband to which user equipment belongs and the maximum OFDM symbol quantity of the frequency band, additional long training field instruction information used to instruct the user equipment whether to send an additional long training field.

S330. Send an indication message to the user equipment, where the indication message includes the additional long training field instruction information.

Specifically, the access point AP compares the maximum OFDM symbol quantities of all the subbands of the frequency band used for uplink transmission, to obtain the maximum OFDM symbol quantity corresponding to the frequency band, and then compares the value relationship between the maximum OFDM symbol quantity of the subband to which the user equipment belongs and the maximum OFDM symbol quantity of the frequency band, to determine the additional long training field instruction information, where the additional long training field instruction information is used to instruct the user equipment whether to send the additional long training field to the AP. Then, the AP sends the indication message that includes the additional long training field instruction information to the user equipment.

In conclusion, according to the information transmission method in this embodiment of the present invention, an AP determines, according to a value relationship between a maximum OFDM symbol quantity of a subband to which user equipment belongs and a maximum OFDM symbol quantity of a frequency band used for uplink transmission, whether the user equipment needs to send an additional long training field. Therefore, when it is determined that the user equipment sends the additional long training field, zero padding overheads and a noise variance in a data transmission process can be reduced, and frequency band resource utilization can be improved. The AP can perform more accurate channel estimation according to the additional long training field, thereby reducing a bit error rate and improving data transmission reliability. In addition, a pilot in the additional long training field facilitates frequency offset estimation in a period of receiving a long training field sequence.

It should be understood that, in this embodiment of the present invention, the maximum orthogonal frequency division multiplexing OFDM symbol quantity of the frequency band used for uplink transmission may be a maximum value of a quantity of OFDM symbols required by the user equipment for sending, on a frequency band occupied in an uplink transmission process, a preamble field and a data field to the AP, and the preamble field may include an initial long training field and/or a signaling field and/or a short training field. Alternatively, the maximum OFDM symbol quantity of the frequency band used for uplink transmission may be a maximum value of a quantity of OFDM symbols required by the user equipment for sending, on a frequency band occupied in an uplink transmission process, a data field to the AP, or the maximum OFDM symbol quantity of the frequency band used for uplink transmission may be a maximum value of a quantity of OFDM symbols required by the user equipment for sending, on a frequency band occupied in an uplink transmission process, another field to the AP. This is not limited in the present invention.

It should be understood that, in this embodiment of the present invention, the maximum OFDM symbol quantity of the subband to which the user equipment belongs may be a maximum value of quantities of OFDM symbols required by all user equipments for sending, on the subband to which the user equipment belongs, a preamble field and a data field to the AP, and the preamble field may include an initial long training field and/or a signaling field and/or a short training field. Alternatively, the maximum OFDM symbol quantity of the subband to which the user equipment belongs may be a maximum value of quantities of OFDM symbols required by all user equipments for sending, on the subband to which the user equipment belongs, a data field to the AP, or the maximum OFDM symbol quantity of the subband to which the user equipment belongs may be a maximum value of quantities of OFDM symbols required by all user equipments for sending, on the subband to which the user equipment belongs, another field to the AP. This is not limited in the present invention.

It should be understood that, in this embodiment of the present invention, each subband may be occupied by one or more user equipments. Quantities of OFDM symbols used by one or more user equipments on a same subband for sending an initial long training field are the same, and quantities of OFDM symbols used by one or more user equipments on different subbands for sending an initial long training field may be the same or different.

It should further be understood that, in this embodiment of the present invention, the initial long training field refers to a long training field that is supposed be sent by the user equipment according to a protocol and is used by the AP for performing channel estimation. The additional long training field refers to an extra long training field sent by the user equipment to the AP in addition to an initial long training field.

In this embodiment of the present invention, optionally, by means of active reporting by the user equipment or querying by the AP and then reporting by the user equipment, the AP may obtain information about an amount of uplink data to be sent by each user equipment in an uplink direction. However, the present invention is not limited thereto.

Specifically, in S310, the AP may determine, according to the maximum quantity of OFDM symbols used by the user equipment for sending the data field in the uplink transmission process and a quantity of spatial-temporal flows corresponding to each subband of the frequency band used for uplink transmission, the maximum OFDM symbol quantity of the frequency band used for uplink transmission, or may determine, according to other information, the maximum OFDM symbol quantity of the frequency band used for uplink transmission. This is not limited in the present invention.

In this embodiment of the present invention, optionally, the AP may determine, according to a frame length and a coding scheme of uplink transmission data and a quantity of data bits included in an OFDM symbol in each subband of the frequency band used for uplink transmission, a quantity of OFDM symbols used by the user equipment for sending the data field, and then obtain, by means of comparison, the maximum quantity of OFDM symbols used by the user equipment for sending the data field.

Specifically, in this embodiment of the present invention, the AP may determine, according to formula (6), the quantity of OFDM symbols used by the user equipment for sending the data field.

$$N_{SYM\_init,u}^{(k)} = \begin{cases} \left\lceil \dfrac{8 \cdot APEP\_LENGTH_u + N_{service} + N_{tail} \cdot N_{ES,u}}{N_{DBPSR,u}^{(k)}} \right\rceil & BCC \\ \left\lceil \dfrac{8 \cdot APEP\_LENGTH_u + N_{service}}{N_{DBPSR,u}^{(k)}} \right\rceil & LDPC \end{cases} \quad (6)$$

k represents a sequence number of a subband of the frequency band used for uplink transmission, $N_{SYM\_init,u}^{(k)}$ represents a quantity of OFDM symbols used by user equipment u on a subband with a sequence number k for sending a data field to the AP, $APEP\_LENGTH_u$ is a length of a data frame corresponding to the data field, and $N_{service}$ is a quantity of fixed bits preceding the data field, and is a constant in a stipulated standard protocol. For example, a value of $N_{service}$ is 16 in an 802.11ac system. $N_{tail}$ represents a quantity of tail bits for enabling binary convolutional code (binary convolutional code, "BCC" for short) to return to a zero state, and is a constant in a stipulated standard protocol. For example, a value of $N_{tail}$ is 6 in the 802.11ac system. $N_{ES,u}$ is a quantity of BCC coders of the user u. $N_{DBPSR,u}^{(k)}$ is a quantity of data bits included in each OFDM symbol (Data Bits per OFDM Symbol) in the subband with the sequence number k, and may be obtained by calculating a modulation and coding scheme (Modulation and Coding Scheme, "MCS" for short) indication parameter, a spatial-temporal flow quantity indication parameter, and the like. ⌈ ⌉ represents rounding up. For low-density parity-check (low density parity check, "LDPC" for short) coding, in an 8021.11ac system, there is ambiguity in indication of an OFDM symbol quantity due to use of a guard interval (Short Guard Interval, "short GI" for short). Therefore, a short guard interval symbol quantity disambiguation (Short GI NSYM Disambiguation) indicator bit and a low-density parity-check extra symbol (LDPC Extra OFDM Symbol) indicator bit in a signaling field are used for assisting in symbol quantity disambiguation. Therefore, for LDPC coding, $N_{SYM\_init,u}^{(k)}$ represents a symbol quantity obtained after disambiguation. The AP may also determine, in another manner, the quantity of OFDM symbols used by the user equipment for sending the data field. This is not limited in the present invention.

In S320, the AP determines the additional long training field instruction information when the AP determines that the maximum OFDM symbol quantity of the subband to which the user equipment belongs is less than the maximum OFDM symbol quantity of the frequency band, where the additional long training field instruction information is used to instruct the user equipment to send the additional long training field to the AP.

The AP determines the additional long training field instruction information when the AP determines that the maximum OFDM symbol quantity of the subband to which the user equipment belongs is equal to the maximum OFDM symbol quantity of the frequency band, where the additional long training field instruction information is used to instruct the user equipment not to send the additional long training field to the AP.

Optionally, FIG. 11 shows another schematic flowchart of the information transmission method 300 according to an embodiment of the present invention. As shown in FIG. 11, the method 300 further includes the following step:

S340. Determine a target quantity of OFDM symbols used by the user equipment for sending the additional long training field, where the target quantity of OFDM symbols is less than or equal to a difference between the maximum OFDM symbol quantity of the frequency band and the maximum OFDM symbol quantity of the subband to which the user equipment belongs.

Correspondingly, in S330, the AP sends the indication message to the user equipment, where the indication message includes the additional long training field instruction information, and the additional long training field instruction information includes the target quantity of OFDM symbols.

Optionally, FIG. 12 shows still another schematic flowchart of the information transmission method 300 according to an embodiment of the present invention. As shown in FIG. 12, the method 300 further includes the following step:

S350. Receive an uplink data packet sent by the user equipment.

Optionally, in S350, as shown in FIG. 4, the uplink data packet includes an initial long training field, an additional long training field, and a data field that are arranged according to a sending time sequence. A sum of a quantity of OFDM symbols used by the user equipment for sending the initial long training field and a target quantity of OFDM symbols used for sending the additional long training field is less than or equal to a preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

Optionally, in S350, as shown in FIG. 5, the uplink data packet includes the first additional long training field, the first data field, the second additional long training field, the second data field, . . . , the $i^{th}$ additional long training field, the $i^{th}$ data field, . . . , the $M^{th}$ additional long training field, and the $M^{th}$ data field that are arranged according to a sending time sequence, where 1≤i≤M, M is a natural number greater than 1, and i is a natural number.

The additional long training field includes the first additional long training field to the $M^{th}$ additional long training field, a sum of a quantity of OFDM symbols used by the user equipment for sending the first additional long training field and a quantity of OFDM symbols used for sending the initial long training field is less than or equal to a preset threshold, and a quantity of OFDM symbols used by the user equipment for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

It should be understood that, in this embodiment of the present invention, the uplink data packet may further include a signaling field and/or a short training field and/or another field that is supposed to be included according to a standard. This is not limited in the present invention.

In this embodiment of the present invention, optionally, a quantity of OFDM symbols used by the user equipment for sending any additional long training field of the M additional long training fields may be the same or different, and a quantity of OFDM symbols used by the user equipment for sending any data field of the M data fields may be the same or different. This is not limited in the present invention.

Specifically, in this embodiment of the present invention, the AP may determine a value of M according to formula (7):

$$M_{parts,LTF} \le \text{floor}\left(\frac{N_{ori\_LTF,RB} + N_{Ex\_LTF,RB}}{N_{ori\_LTF,RB}}\right) \quad (7)$$

$M_{parts,LTF}$ represents the value of M, $N_{ori\_LTF,RB}$ represents a quantity of OFDM symbols used by the user equipment for sending, on each subband, an initial long training field to the AP, $N_{Ex\_LTF,RB}$ represents a quantity of OFDM symbols used by the user equipment for sending, on each subband, an additional long training field to the AP, and a floor function represents rounding down.

In this embodiment of the present invention, optionally, a sum of the quantity $N_{Ex\_LTF,RB}$ of OFDM symbols used by the user equipment for sending the M additional long training fields to the AP and the quantity $N_{ori\_LTF,RB}$ of OFDM symbols used for sending the initial long training field may be approximately evenly divided into M parts. That is, a quantity of OFDM symbols used by the user equipment for sending the first additional long training field of first $\mod(N_{ori\_LTF,RB}+N_{Ex\_LTF,RB},M_{parts,LTF})$ additional long training fields to the AP is $$\text{floor}\left(\frac{N_{ori\_LTF,RB} + N_{Ex\_LTF,RB}}{M_{parts,LTF}}\right) - N_{ori\_LTF,RB} + 1,$$

a quantity of OFDM symbols used by the user equipment for sending any additional long training field of the first mod $(N_{ori\_LTF,RB}+N_{Ex\_LTF,RB},M_{parts,LTF})$ additional long training fields except the first additional long training field is $$\text{floor}\left(\frac{N_{ori\_LTF,RB} + N_{Ex\_LTF,RB}}{M_{parts,LTF}}\right) + 1,$$

and a quantity of OFDM symbols used by the user equipment for sending any additional long training field of the M additional long training fields except the first mod $(N_{ori\_LTF,RB}+N_{Ex\_LTF,RB},M_{parts,LTF})$ additional long training fields is $$\text{floor}\left(\frac{N_{ori\_LTF,RB} + N_{Ex\_LTF,RB}}{M_{parts,LTF}}\right).$$

The sum of the quantity of OFDM symbols used by the user equipment for sending the initial long training field and the quantity of OFDM symbols used for sending the first additional long training field is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

In this embodiment of the present invention, alternatively, the quantity of OFDM symbols used by the user equipment for sending the first additional long training field may be preferentially allocated, and a quantity of OFDM symbols used by the user equipment for sending any additional long training field of the M additional long training fields except the first additional long training field may be evenly allocated. In this case, the sum of the quantity of OFDM symbols used by the user equipment for sending the initial long training field and the quantity of OFDM symbols used for sending the first additional long training field is less than or equal to the preset threshold, and the quantity of OFDM symbols used for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

In this embodiment of the present invention, preferably, the quantity of OFDM symbols used by the user equipment for sending the additional long training field to the AP is equal to the difference between the maximum OFDM symbol quantity of the frequency band and the maximum OFDM symbol quantity of the subband to which the user equipment belongs, the quantity of OFDM symbols used by the user equipment for sending any additional long training field of the second additional long training field to the $M^{th}$ additional long training field in the M additional long training fields is $$\text{floor}\left(\frac{N_{ori\_LTF,RB} + N_{Ex\_LTF,RB}}{M_{parts,LTF}}\right),$$

and the quantity of OFDM symbols used by the user equipment for sending the first additional long training field is $$N_{Ex\_LTF,RB} - (M_{parts,LTF} - 1) \times \text{floor}\left(\frac{N_{ori\_LTF,RB} + N_{Ex\_LTF,RB}}{M_{parts,LTF}}\right).$$

$M_{parts,LTF}$ represents a value of M, $N_{ori\_LTF,RB}$ represents a quantity of OFDM symbols used by the user equipment for sending, on each subband, an initial long training field to the AP, $M_{parts,LTF}$ represents a quantity of OFDM symbols used by the user equipment for sending, on each subband, an additional long training field to the AP, and a floor function represents rounding down.

In this embodiment of the present invention, optionally, a quantity of OFDM symbols used by the user equipment for sending the M data fields may be approximately evenly allocated. That is, a quantity of OFDM symbols used by the user equipment for sending any data field of first mod $(N_{sym,RB},M_{parts,LTF,RB})$ data fields is $$\text{floor}\left(\frac{N_{sym,RB}}{M_{parts,LTF,RB}}\right) + 1,$$

and a quantity of OFDM symbols used for sending any data field of the M data fields except the first $\mod(N_{sym,RB}, M_{parts,LTF,RB})$ data fields is $$\text{floor}\left(\frac{N_{sym,RB}}{M_{parts,LTF,RB}}\right).$$

$N_{sym,RB}$ represents a maximum value of a quantity of OFDM symbols used by the user equipment for sending a data field on each subband. However, the present invention is not limited thereto.

In conclusion, according to the information transmission method in this embodiment of the present invention, an AP determines, according to a value relationship between a maximum OFDM symbol quantity of a subband to which user equipment belongs and a maximum OFDM symbol quantity of a frequency band used for uplink transmission, whether the user equipment needs to send an additional long training field to the AP. Therefore, when it is determined that the user equipment sends the additional long training field to the AP, frequency band resource utilization can be improved, and zero padding overheads, a noise variance, and impact of a channel change in a data transmission process can be reduced. The AP can perform more accurate channel estimation according to the additional long training field, thereby reducing a bit error rate and improving data transmission reliability. In addition, a pilot in the additional long training field facilitates frequency offset estimation in a period of receiving a long training field sequence.

In this embodiment of the present invention, optionally, the method 300 further includes: determining sending time sequence indication information used for indicating a sending time sequence of the additional long training field in the uplink data packet.

Correspondingly, in S330, the AP sends the indication message to the user equipment, where the indication message includes the sending time sequence indication information.

Optionally, in S330, the AP sends a downlink scheduling frame that includes a signaling field to the user equipment, where the signaling field carries the indication message.

In this embodiment of the present invention, optionally, the signaling field includes an indication field for an additional long training field. As shown in FIG. 6, the indication field for an additional long training field may include different quantities of bits. According to indication information of the indication field for an additional long training field, the user equipment may determine whether to send an additional long training field to the AP, or when an additional long training field is being sent, determine a quantity of OFDM symbols used for sending the additional long training field.

Specifically, in this embodiment of the present invention, the indication field for an additional long training field may include one bit, where "1" instructs the user equipment to send an additional long training field, and "0" instructs the user equipment not to send an additional long training field; or "0" instructs the user equipment to send an additional long training field, and "1" instructs the user equipment not to send an additional long training field. Alternatively, the indication field for an additional long training field may include two bits, where "00" instructs the user equipment not to send an additional long training field, "01" instructs the user equipment to send an additional long training field, and "10" and "11" are reserved fields; or "00" instructs the user equipment not to send an additional long training field, and "01", "10", and "11" all instruct the user equipment to send an additional long training field. However, the present invention is not limited thereto.

The indication field for an additional long training field may include two bits, where "00" instructs the user equipment not to send an additional long training field; "01" instructs the user equipment to send an additional long training field, and indicates that a quantity of OFDM symbols used for sending the additional long training field is 1; "10" instructs the user equipment to send an additional long training field, and indicates that a quantity of OFDM symbols used for sending the additional long training field is 2; and "11" instructs the user equipment to send an additional long training field, and indicates that a quantity of OFDM symbols used for sending the additional long training field is 3. If a quantity of OFDM symbols used by the user equipment for sending an additional long training field is larger, the indication field for an additional long training field may include more bits. For example, the indication field for an additional long training field may be three bits. However, the present invention is not limited thereto.

In this embodiment of the present invention, optionally, the signaling field further includes an indication field for an additional long training field sending mode. As shown in FIG. 7, the indication field for an additional long training field sending mode may include different quantities of bits, and may indicate a sending mode of an additional long training field, that is, a sending time sequence of an additional long training field in an uplink data packet. The indication field for an additional long training field sending mode may include two bits, where "00" instructs to send an additional long training field in a mode 1, "01" instructs to send an additional long training field in a mode 2, "10" instructs to send an additional long training field in a mode 3, and "11" is a reserved field. Alternatively, the indication field for an additional long training field sending mode may include one bit, where "0" instructs to send an additional long training field in a mode 1, and "1" instructs to send an additional long training field in a mode 2. The modes 1, 2, and 3 are corresponding to different sending time sequences of the additional long training field in the uplink data packet in this embodiment of the present invention. However, the present invention is not limited thereto.

In conclusion, according to the information transmission method in this embodiment of the present invention, an AP determines, according to a value relationship between a maximum OFDM symbol quantity of a subband to which user equipment belongs and a maximum OFDM symbol quantity of a frequency band used for uplink transmission, whether the user equipment needs to send an additional long training field to the AP. Therefore, when it is determined that the user equipment sends the additional long training field to the AP, frequency band resource utilization can be improved, and zero padding overheads, a noise variance, and impact of a channel change in a data transmission process can be reduced. The AP can perform more accurate channel estimation according to the additional long training field, thereby reducing a bit error rate and improving data transmission reliability. In addition, a pilot in the additional long training field facilitates frequency offset estimation in a period of receiving a long training field sequence.

Figure 14:
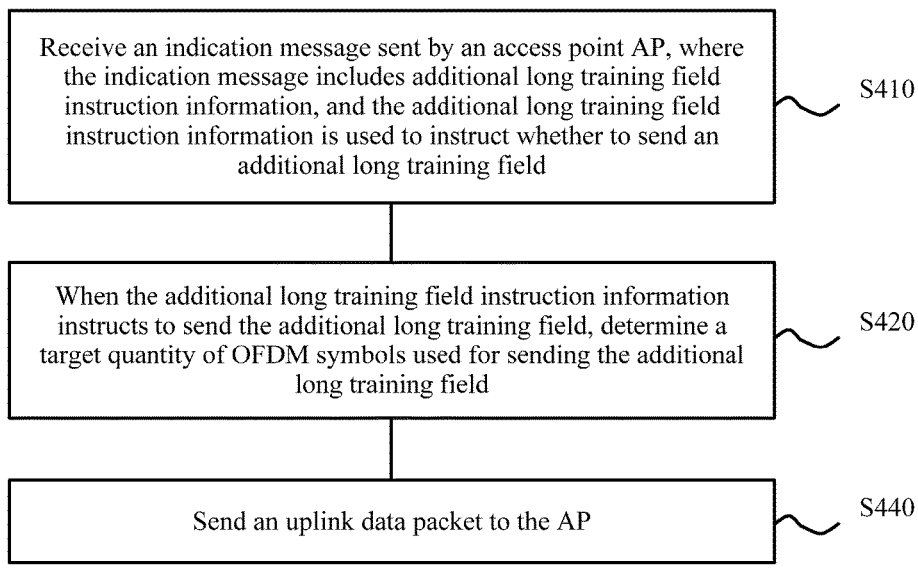
FIG. 14 is still another schematic flowchart of an information transmission method according to still another embodiment of the present invention.

With reference to FIG. 10 to FIG. 12, the foregoing describes in detail the information transmission method 300 provided in this embodiment of the present invention. With reference to FIG. 13 and FIG. 14, the following describes in detail an information transmission method 400 provided in an embodiment of the present invention.

FIG. 13 shows a schematic flowchart of an information transmission method 400 according to an embodiment of the present invention, and the method 400 may be executed by user equipment. As shown in FIG. 13, the method 400 includes the following steps:

S410. Receive an indication message sent by an access point AP, where the indication message includes additional long training field instruction information, and the additional long training field instruction information is used to instruct user equipment whether to send an additional long training field.

S420. When the additional long training field instruction information instructs to send the additional long training field, determine a target quantity of OFDM symbols used for sending the additional long training field.

S430. Send the additional long training field and an initial long training field to the AP according to the target quantity of OFDM symbols.

Specifically, the user equipment receives the indication message that includes the additional long training field instruction information and is sent by the access point AP, where the additional long training field instruction information is used to instruct the user equipment whether to send the additional long training field to the AP. When determining that the additional long training field instruction information instructs the user equipment to send the additional long training field, the user equipment determines the target quantity of OFDM symbols used for sending the additional long training field, and sends the additional long training field and the initial long training field to the AP according to the target quantity of OFDM symbols.

In conclusion, according to the information transmission method in this embodiment of the present invention, user equipment determines, according to additional long training field instruction information in a received indication message, whether to send an additional long training field. Therefore, when the user equipment determines to send the additional long training field, frequency band resource utilization can be improved, and zero padding overheads and a noise variance in a data transmission process can be reduced. An AP can perform more accurate channel estimation by using the additional long training field, thereby reducing a bit error rate and improving data transmission reliability. In addition, a pilot in the additional long training field facilitates frequency offset estimation in a period of receiving a long training field sequence.

Optionally, in S410, the additional long training field instruction information includes a target quantity of OFDM symbols used by the user equipment for sending the additional long training field. Correspondingly, in S420, the user equipment determines the target quantity that is of OFDM symbols used by the user equipment for sending the additional long training field and is included in the additional long training field instruction information as the target quantity of OFDM symbols used for sending the additional long training field.

Optionally, in S410, the indication message further includes sending time sequence indication information, and the sending time sequence indication information is used to indicate a sending time sequence of the additional long training field in an uplink data packet. Correspondingly, in S430, the user equipment sends the additional long training field and the initial long training field to the AP according to the target quantity of OFDM symbols and the sending time sequence that is of the additional long training field in the uplink data packet and is indicated by the sending time sequence indication information.

FIG. 14 shows another schematic flowchart of the information transmission method 400 according to an embodiment of the present invention. As shown in FIG. 14, the method 400 further includes the following step:

S440. Send an uplink data packet to the AP.

Optionally, in S440, as shown in FIG. 4, the uplink data packet includes an initial long training field, an additional long training field, and a data field that are arranged according to a sending time sequence. A sum of a quantity of OFDM symbols used by the user equipment for sending the initial long training field and a target quantity of OFDM symbols used for sending the additional long training field is less than or equal to a preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

Optionally, in S440, as shown in FIG. 5, the uplink data packet includes the first additional long training field, the first data field, the second additional long training field, the second data field, . . . , the $i^{th}$ additional long training field, the $i^{th}$ data field, . . . , the $M^{th}$ additional long training field, and the $M^{th}$ data field that are arranged according to a sending time sequence, where 1≤i≤M, M is a natural number greater than 1, and i is a natural number.

The additional long training field includes the first additional long training field to the $M^{th}$ additional long training field, a sum of a quantity of OFDM symbols used by the user equipment for sending the first additional long training field and a quantity of OFDM symbols used for sending the initial long training field is less than or equal to a preset threshold, and a quantity of OFDM symbols used by the user equipment for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

It should be understood that, in this embodiment of the present invention, the uplink data packet may further include a signaling field and/or a short training field and/or another field that is supposed to be included according to a standard. This is not limited in the present invention.

In this embodiment of the present invention, optionally, a quantity of OFDM symbols used by the user equipment for sending any additional long training field of the M additional long training fields may be the same or different, and a quantity of OFDM symbols used by the user equipment for sending any data field of the M data fields may be the same or different. This is not limited in the present invention.

Optionally, in S410, the user equipment receives a downlink scheduling frame that includes a signaling field and is sent by the access point, where the signaling field carries the indication message.

In this embodiment of the present invention, optionally, the signaling field includes an indication field for an additional long training field. As shown in FIG. 6, the indication field for an additional long training field may include different quantities of bits. According to indication information of the indication field for an additional long training field, the user equipment may determine whether to send an additional long training field to the AP, or when an additional long training field is being sent, determine a quantity of OFDM symbols used for sending the additional long training field.

Specifically, in this embodiment of the present invention, the indication field for an additional long training field may include one bit, where "1" instructs the user equipment to send an additional long training field, and "0" instructs the user equipment not to send an additional long training field; or "0" instructs the user equipment to send an additional long training field, and "1" instructs the user equipment not to send an additional long training field. Alternatively, the indication field for an additional long training field may include two bits, where "00" instructs the user equipment not to send an additional long training field, "01" instructs the user equipment to send an additional long training field, and "10" and "11" are reserved fields; or "00" instructs the user equipment not to send an additional long training field, and "01", "10", and "11" all instruct the user equipment to send an additional long training field. However, the present invention is not limited thereto.

The indication field for an additional long training field may include two bits, where "00" instructs the user equipment not to send an additional long training field; "01" instructs the user equipment to send an additional long training field, and indicates that a quantity of OFDM symbols used for sending the additional long training field is 1; "10" instructs the user equipment to send an additional long training field, and indicates that a quantity of OFDM symbols used for sending the additional long training field is 2; and "11" instructs the user equipment to send an additional long training field, and indicates that a quantity of OFDM symbols used for sending the additional long training field is 3. If a quantity of OFDM symbols used by the user equipment for sending an additional long training field is larger, the indication field for an additional long training field may include more bits. For example, the indication field for an additional long training field may be three bits. However, the present invention is not limited thereto.

In this embodiment of the present invention, optionally, the signaling field further includes an indication field for an additional long training field sending mode. As shown in FIG. 7, the indication field for an additional long training field sending mode includes different quantities of bits, and may indicate a sending mode of an additional long training field, that is, a sending time sequence of an additional long training field in an uplink data packet. The indication field for an additional long training field sending mode may include two bits, where "00" instructs to send an additional long training field in a mode 1, "01" instructs to send an additional long training field in a mode 2, "10" instructs to send an additional long training field in a mode 3, and "11" is a reserved field. Alternatively, the indication field for an additional long training field sending mode may include one bit, where "0" instructs to send an additional long training field in a mode 1, and "1" instructs to send an additional long training field in a mode 2. The modes 1, 2, and 3 are corresponding to different sending time sequences of the additional long training field in the uplink data packet in this embodiment of the present invention. However, the present invention is not limited thereto.

Optionally, in S420, when the additional long training field instruction information instructs the user equipment to send the additional long training field, the user equipment obtains a maximum OFDM symbol quantity of a frequency band used for uplink transmission and a maximum OFDM symbol quantity of a subband to which the user equipment belongs, and determines, according to the maximum OFDM symbol quantity of the frequency band and the maximum OFDM symbol quantity of the subband to which the user equipment belongs, the target quantity of OFDM symbols used for sending the additional long training field to the AP. The target quantity of OFDM symbols used by the user equipment for sending the additional long training field is less than or equal to a difference between the maximum OFDM symbol quantity of the frequency band and the maximum OFDM symbol quantity of the subband to which the user equipment belongs.

In this embodiment of the present invention, optionally, the user equipment may obtain, according to indication information that is in the signaling field and is sent by the AP, the maximum OFDM symbol quantity of the frequency band used for uplink transmission and the maximum OFDM symbol quantity of the subband to which the user equipment belongs, or may obtain, in another manner, the maximum OFDM symbol quantity of the frequency band used for uplink transmission and the maximum OFDM symbol quantity of the subband to which the user equipment belongs. This is not limited in the present invention.

Optionally, in S420, when the additional long training field instruction information instructs the user equipment to send the additional long training field, the user equipment may obtain a maximum quantity of OFDM symbols used by all user equipments for sending an initial long training field on the frequency band and a quantity of OFDM symbols used by all user equipments for sending an initial long training field on a subband to which the user equipment belongs. The quantity of OFDM symbols used by the user equipment for sending the additional long training field is equal to a difference between the maximum quantity of OFDM symbols used by all the user equipments for sending the initial long training field on the frequency band and the quantity of OFDM symbols used by all the user equipments for sending the initial long training field on the subband to which the user equipment belongs. Correspondingly, when performing resource scheduling for the user equipment, the AP performs resource allocation according to remaining resources on each subband except resources occupied by the maximum quantity of OFDM symbols used for sending the initial long training field.

It should be understood that, in this embodiment of the present invention, when Multiple Input Multiple Output MIMO transmission is performed, for any subcarrier, a channel matrix is multiplied by an orthogonal mapping matrix, that is, a P matrix, to distinguish spatial-temporal flows. It is assumed that the user equipment sends N spatial-temporal flows to the AP, and the quantity of OFDM symbols used by the user equipment for sending the initial long training field to the AP is N. Considering frame alignment, the quantity of OFDM symbols used by the user equipment for sending the additional long training field to the AP is S. In this case, in a data transmission process, a channel matrix of the N+S OFDM symbols needs to be multiplied by the P matrix. When N+S≤4, the P matrix is selected from a matrix (04); when N+S is equal to 5 or 6, the P matrix is selected from a matrix (05); when N+S is equal to 7 or 8, the P matrix is selected from a matrix (06), and a size of the P matrix is selected according to a size of N*(N+S).

$$P_{VHTLTF,4\times 4} = \begin{pmatrix} 1 & -1 & 1 & 1 \\ 1 & 1 & -1 & 1 \\ 1 & 1 & 1 & -1 \\ -1 & 1 & 1 & 1 \end{pmatrix} \quad (04)$$

-continued $$P_{VHTLTF,6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad (05)$$

$$w = \exp(-j2\pi/6)$$

$$P_{VHLTLF,8\times 8} = \begin{bmatrix} P_{VHTLTF,4\times 4} & P_{VHTLTF,4\times 4} \\ P_{VHTLTF,4\times 4} & -P_{VHTLTF,4\times 4} \end{bmatrix} \quad (06)$$

Specifically, in this embodiment of the present invention, it is assumed that the quantity of OFDM symbols used by the user equipment for sending the initial long training field to the AP is 2. Considering frame alignment, the quantity of OFDM symbols used by the user equipment for sending the additional long training field to the AP is 2, and in this case, $$[Y_{t_1}\ Y_{t_2}\ Y_{t_3}\ Y_{t_4}]_x = \begin{bmatrix} h_{11} & h_{12} \\ h_{21} & h_{22} \end{bmatrix} \begin{bmatrix} 1 & -1 & 1 & 1 \\ 1 & 1 & -1 & 1 \end{bmatrix} LTF_x + \quad (8)$$
$$[N_{t_1}\ N_{t_2}\ N_{t_3}\ N_{t_4}]_x$$

$$[Y_{t_1}\ Y_{t_2}\ Y_{t_3}\ Y_{t_4}]_x \begin{bmatrix} 1 & 1 \\ -1 & 1 \\ 1 & -1 \\ 1 & 1 \end{bmatrix} * \quad (9)$$

$$\frac{1}{4} = \begin{bmatrix} h_{11} & h_{12} \\ h_{21} & h_{22} \end{bmatrix} LTF_x + [N_{t_1}\ N_{t_2}\ N_{t_3}\ N_{t_4}]_x \begin{bmatrix} 1 & 1 \\ -1 & 1 \\ 1 & -1 \\ 1 & 1 \end{bmatrix} * \frac{1}{4}$$

$$Y_{t_1} = \begin{bmatrix} y_{t_1 i} \\ y_{t_2 i} \end{bmatrix} \text{ and } N_{T_1} = \begin{bmatrix} n_{t_1 i} \\ n_{t_2 i} \end{bmatrix}$$

represent a receive signal and noise respectively. Further, it may be concluded that:

$$[N_{t_1}\ N_{t_2}\ N_{t_3}\ N_{t_4}]_x \begin{bmatrix} 1 & 1 \\ -1 & 1 \\ 1 & -1 \\ 1 & 1 \end{bmatrix} * \frac{1}{4} = \begin{bmatrix} n_{11} - n_{12} + n_{13} + n_{14} \\ n_{21} + n_{22} - n_{23} + n_{24} \end{bmatrix} * \frac{1}{4} \quad (10)$$

It is assumed that noise power of $n_{ti}$ is $\sigma^2$. It may be learned that a noise variance is half of an original noise variance, and is decreased by 3 dB.

In conclusion, according to the information transmission method in this embodiment of the present invention, user equipment determines, according to additional long training field instruction information in a received indication message, whether to send an additional long training field. Therefore, when determining to send the additional long training field, the user equipment may divide the additional long training field into several parts for sending, so that frequency band resource utilization can be improved, and zero padding overheads and a noise variance in a data transmission process can be reduced. An AP can perform more accurate channel estimation by using the additional long training field, thereby reducing a bit error rate and improving data transmission reliability. In addition, a pilot in the additional long training field facilitates frequency offset estimation in a period of receiving a long training field sequence.

Figure 15:
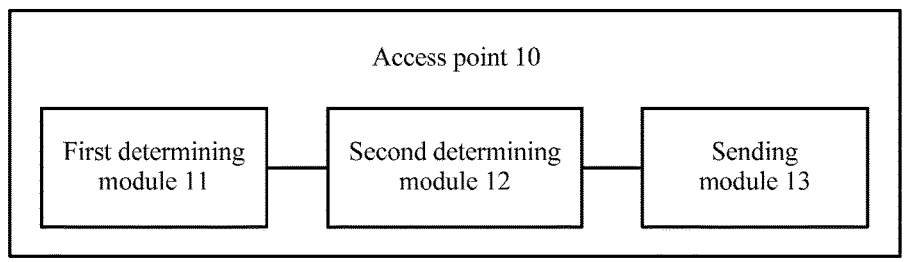
FIG. 15 is a schematic block diagram of an access point for information transmission according to an embodiment of the present invention.
Figure 16:
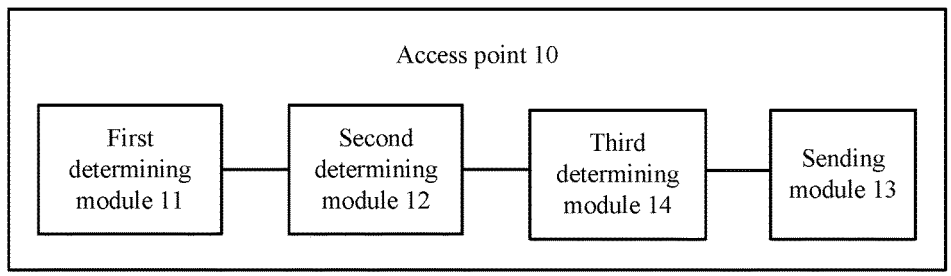
FIG. 16 is another schematic block diagram of an access point for information transmission according to an embodiment of the present invention.
Figure 17:
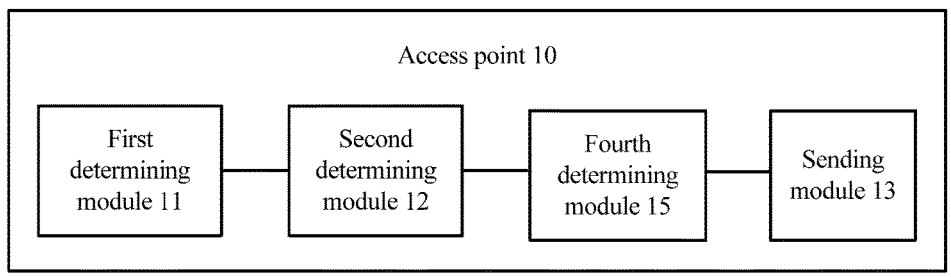
FIG. 17 is still another schematic block diagram of an access point for information transmission according to an embodiment of the present invention.

With reference to FIG. 1 to FIG. 14, the foregoing describes in detail the information transmission methods provided in the embodiments of the present invention. With reference to FIG. 15 to FIG. 17, the following describes in detail an access point for information transmission provided in an embodiment of the present invention.

FIG. 15 is a schematic block diagram of an access point 10 for information transmission according to an embodiment of the present invention. As shown in FIG. 15, the access point 10 includes:

a first determining module 11, configured to determine a maximum orthogonal frequency division multiplexing OFDM symbol quantity of a frequency band used for downlink transmission, where the maximum OFDM symbol quantity of the frequency band is a maximum value of maximum OFDM symbol quantities of all subbands of the frequency band;

a second determining module 12, configured to determine, according to a value relationship between a maximum OFDM symbol quantity of a subband to which user equipment belongs and the maximum OFDM symbol quantity that is of the frequency band and is determined by the first determining module 11, additional long training field instruction information used to instruct whether to send an additional long training field to the user equipment; and a sending module 13, configured to send an indication message to the user equipment, where the indication message includes the additional long training field instruction information determined by the second determining module 12.

Specifically, the first determining module 11 of the access point AP compares the maximum OFDM symbol quantities of all the subbands of the frequency band used for downlink transmission, to obtain the maximum OFDM symbol quantity corresponding to the frequency band, and then the second determining module 12 of the AP compares the value relationship between the maximum OFDM symbol quantity of the subband to which the user equipment belongs and the maximum OFDM symbol quantity of the frequency band, to determine the additional long training field instruction information, where the additional long training field instruction information is used to instruct the AP whether to send the additional long training field to the user equipment. Then, the AP sends, by using the sending module 13, the indication message that includes the additional long training field instruction information to the user equipment.

In conclusion, the access point in this embodiment of the present invention determines, according to a value relationship between a maximum OFDM symbol quantity of a subband to which user equipment belongs and a maximum OFDM symbol quantity of a frequency band used for downlink transmission, whether to send an additional long training field to the user equipment. Therefore, when the access point determines to send the additional long training field to the user equipment, zero padding overheads and a noise variance in a data transmission process can be reduced, and frequency band resource utilization can be improved. The user equipment can perform more accurate channel estimation according to the additional long training field, thereby reducing a bit error rate and improving data transmission reliability.

In this embodiment of the present invention, optionally, the first determining module 11 is specifically configured to determine, according to a frame length and a coding scheme of downlink transmission data, a quantity of spatial-temporal flows corresponding to each subband of the frequency band, and a quantity of data bits included in an OFDM symbol in each subband of the frequency band, the maximum OFDM symbol quantity of the frequency band used for downlink transmission.

Specifically, in this embodiment of the present invention, the second determining module 12 is specifically configured to determine the additional long training field instruction information when the maximum OFDM symbol quantity of the subband to which the user equipment belongs is less than the maximum OFDM symbol quantity that is of the frequency band and is determined by the first determining module 11, where the additional long training field instruction information is used to instruct the AP to send the additional long training field to the user equipment.

Correspondingly, the sending module 13 is specifically configured to: send the additional long training field and an initial long training field to the user equipment according to the additional long training field instruction information.

Alternatively, the second determining module 12 is specifically configured to determine the additional long training field instruction information when the maximum OFDM symbol quantity of the subband to which the user equipment belongs is equal to the maximum OFDM symbol quantity that is of the frequency band and is determined by the first determining module 11, where the additional long training field instruction information is used to instruct the AP not to send the additional long training field to the user equipment.

In this embodiment of the present invention, optionally, as shown in FIG. 16, the access point 10 further includes: a third determining module 14, configured to determine a target quantity of OFDM symbols used for sending the additional long training field to the user equipment, where the target quantity of OFDM symbols is less than or equal to a difference between the maximum OFDM symbol quantity of the frequency band and the maximum OFDM symbol quantity of the subband to which the user equipment belongs.

Correspondingly, the additional long training field instruction information determined by the second determining module 12 includes the target quantity of OFDM symbols that is determined by the third determining module 14.

In this embodiment of the present invention, optionally, the sending module 13 is further configured to send a downlink data packet to the user equipment, where the downlink data packet includes an initial long training field, an additional long training field, and a data field that are arranged according to a sending time sequence, and a sum of a quantity of OFDM symbols used by the AP for sending the initial long training field and a target quantity of OFDM symbols used for sending the additional long training field is less than or equal to a preset threshold.

In this embodiment of the present invention, optionally, the sending module 13 is further configured to send a downlink data packet to the user equipment, where the downlink data packet includes an initial long training field, the $i^{th}$ additional long training field, and the $i^{th}$ data field that are arranged according to a sending time sequence, the $i^{th}$ additional long training field and the $i^{th}$ data field are arranged alternately, $1 \leq i \leq M$, M is a natural number greater than 1, and i is a natural number.

The additional long training field includes the first additional long training field to the $M^{th}$ additional long training field, a sum of a quantity of OFDM symbols used by the AP for sending the first additional long training field and a quantity of OFDM symbols used for sending the initial long training field is less than or equal to a preset threshold, and a quantity of OFDM symbols used by the AP for sending any additional long training field of the second additional long training field to the $M^{th}$ additional long training field is greater than or equal to the quantity of OFDM symbols used for sending the initial long training field and is less than or equal to the preset threshold.

It should be understood that, in this embodiment of the present invention, the downlink data packet may further include a signaling field and/or a short training field and/or another field that is supposed to be included according to a standard. This is not limited in the present invention.

In this embodiment of the present invention, optionally, a quantity of OFDM symbols used by the AP for sending any additional long training field of the M additional long training fields may be the same or different, and a quantity of OFDM symbols used by the AP for sending any data field of the M data fields may be the same or different. This is not limited in the present invention.

In this embodiment of the present invention, optionally, the sending module 13 is specifically configured to send the downlink data packet that includes a signaling field to the user equipment, where the signaling field carries the indication message.

In this embodiment of the present invention, optionally, as shown in FIG. 17, the access point 10 further includes: a fourth determining module 15, configured to determine sending time sequence indication information used to indicate a sending time sequence of the additional long training field in the downlink data packet. Correspondingly, the indication message sent by the sending module 13 further includes the sending time sequence indication information determined by the fourth determining module 15.

In conclusion, the access point in this embodiment of the present invention determines, according to a value relationship between a maximum OFDM symbol quantity of a subband to which user equipment belongs and a maximum OFDM symbol quantity of a frequency band used for downlink transmission, whether to send an additional long training field to the user equipment. Therefore, when determining to send the additional long training field to the user equipment, the access point may divide the additional long training field into several parts for sending, so that frequency band resource utilization can be improved, and zero padding overheads, a noise variance, and impact of a channel change in a data transmission process can be reduced. The user equipment can perform more accurate channel estimation according to the additional long training field, thereby reducing a bit error rate and improving data transmission reliability.

The foregoing and other operations and/or functions of the modules of the access point 10 are respectively used to implement corresponding procedures of the methods in FIG. 1 to FIG. 3. For brevity, details are not described herein repeatedly.

Figure 18:
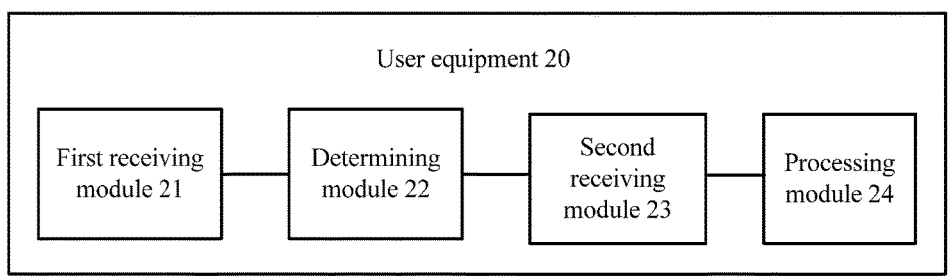
FIG. 18 is a schematic block diagram of user equipment for information transmission according to an embodiment of the present invention.
Figure 19:
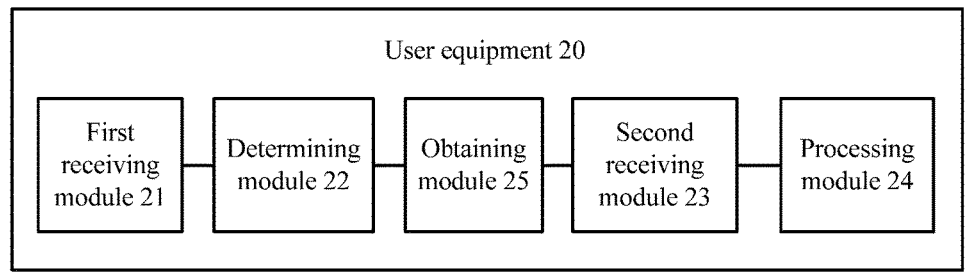
FIG. 19 is another schematic block diagram of user equipment for information transmission according to an embodiment of the present invention.

With reference to FIG. 15 to FIG. 17, the foregoing describes in detail the access point 10 for information transmission provided in this embodiment of the present invention. With reference to FIG. 18 and FIG. 19, the following describes in detail user equipment 20 for information transmission provided in an embodiment of the present invention.

FIG. 18 shows a schematic block diagram of user equipment 20 according to an embodiment of the present invention. As shown in FIG. 18, the user equipment 20 includes:

a first receiving module 21, configured to receive an indication message sent by an access point AP, where the indication message includes additional long training field instruction information, and the additional long training field instruction information is used to instruct the AP whether to send an additional long training field;

a determining module 22, configured to: when the additional long training field instruction information included in the indication message received by the receiving module 21 instructs the AP to send the additional long training field, determine a target quantity of OFDM symbols used by the AP for sending the additional long training field;

a second receiving module 23, configured to receive, according to the target quantity of OFDM symbols that is determined by the determining module, the additional long training field and an initial long training field that are sent by the AP; and a processing module 24, configured to perform channel estimation according to the additional long training field and the initial long training field that are received by the second receiving module 23.

Specifically, the first receiving module 21 of the user equipment receives the indication message that includes the additional long training field instruction information and is sent by the access point AP, where the additional long training field instruction information is used to instruct the AP whether to send the additional long training field to the user equipment. When the additional long training field instruction information included in the indication message received by the first receiving module 21 instructs the AP to send the additional long training field, the determining module 22 of the user equipment determines the target quantity of OFDM symbols used by the AP for sending the additional long training field. Then the second receiving module 23 of the user equipment receives, according to the target quantity of OFDM symbols that is determined by the determining module 22, the additional long training field and the initial long training field that are sent by the AP. The processing module 24 of the user equipment performs channel estimation according to the additional long training field and the initial long training field that are received by the second receiving module 23.

In conclusion, the user equipment in this embodiment of the present invention determines, according to additional long training field instruction information in a received indication message, whether an AP sends an additional long training field. Therefore, when it is determined that the AP sends the additional long training field, frequency band resource utilization can be improved, and zero padding overheads and a noise variance in a data transmission process can be reduced. The user equipment can perform more accurate channel estimation by using the additional long training field, thereby reducing a bit error rate and improving data transmission reliability.

In this embodiment of the present invention, optionally, the first receiving module 21 receives a downlink data packet that includes a signaling field and is sent by the access point AP, where the signaling field carries the indication message.

In this embodiment of the present invention, optionally, the additional long training field instruction information included in the indication message received by the first receiving module 21 includes a target quantity of OFDM symbols used by the AP for sending the additional long training field. Correspondingly, the determining module 22 is specifically configured to determine the target quantity that is of OFDM symbols used by the AP for sending the additional long training field and is included in the additional long training field instruction information as the target quantity of OFDM symbols used by the AP for sending the additional long training field.

In this embodiment of the present invention, optionally, as shown in FIG. 19, when the additional long training field instruction information included in the indication message received by the first receiving module 21 instructs the AP to send the additional long training field, the user equipment 20 further includes: an obtaining module 25, configured to obtain a maximum OFDM symbol quantity of a frequency band used for downlink transmission and a maximum OFDM symbol quantity of a subband to which the user equipment 20 belongs.

Correspondingly, the determining module 22 is specifically configured to determine, according to the maximum OFDM symbol quantity of the frequency band and the maximum OFDM symbol quantity of the subband to which the user equipment belongs that are obtained by the obtaining module 25, the target quantity of OFDM symbols used by the AP for sending the additional long training field, where the target quantity of OFDM symbols used by the AP for sending the additional long training field is less than or equal to a difference between the maximum OFDM symbol quantity of the frequency band and the maximum OFDM symbol quantity of the subband to which the user equipment belongs.

In this embodiment of the present invention, optionally, when the additional long training field instruction information included in the indication message received by the first receiving module 21 instructs the AP to send the additional long training field, the obtaining module 24 is further configured to obtain a maximum quantity of OFDM symbols used by the AP for sending an initial long training field on the frequency band and a quantity of OFDM symbols used by the AP for sending an initial long training field on a subband.

Correspondingly, the determining module 22 is specifically configured to determine a difference between the maximum quantity of OFDM symbols used by the AP for sending the initial long training field on the frequency band and the quantity of OFDM symbols used by the AP for sending the initial long training field on the subband as the quantity of OFDM symbols used by the AP for sending the additional long training field.

In this embodiment of the present invention, optionally, the indication message received by the first receiving module 21 further includes sending time sequence indication information, and the sending time sequence indication information is used to indicate a sending time sequence of the additional long training field in the downlink data packet. Correspondingly, the processing module 24 is specifically configured to perform channel estimation according to the additional long training field received by the second receiving module 23, the initial long training field received by the second receiving module 23, and the sending time sequence of the additional long training field in the downlink data packet.

In this embodiment of the present invention, optionally, the second receiving module 23 is further configured to receive a downlink data packet sent by the access point AP, where the downlink data packet includes an initial long training field, an additional long training field, and a data field that are arranged according to a sending time sequence. A sum of a quantity of OFDM symbols used by the AP for sending the initial long training field and a target quantity of OFDM symbols used for sending the additional long training field is less than or equal to a preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

In this embodiment of the present invention, optionally, the second receiving module 23 is further configured to receive a downlink data packet sent by the access point AP, where the downlink data packet includes the first additional long training field, the first data field, the second additional long training field, the second data field, . . . , the $i^{th}$ additional long training field, the $i^{th}$ data field, . . . , the $M^{th}$ additional long training field, and the $M^{th}$ data field that are arranged according to a sending time sequence, where 1≤i≤M, M is a natural number greater than 1, and i is a natural number.

The additional long training field includes the first additional long training field to the $M^{th}$ additional long training field, a sum of a quantity of OFDM symbols used by the AP for sending the first additional long training field and a quantity of OFDM symbols used for sending the initial long training field is less than or equal to a preset threshold, and a quantity of OFDM symbols used by the AP for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

It should be understood that, in this embodiment of the present invention, the downlink data packet may further include a signaling field and/or a short training field and/or another field that is supposed to be included according to a standard. This is not limited in the present invention.

In conclusion, the user equipment in this embodiment of the present invention determines, according to additional long training field instruction information in a received indication message, whether an AP sends an additional long training field. Therefore, when it is determined that the AP sends the additional long training field, frequency band resource utilization can be improved, and zero padding overheads, a noise variance, and impact of a channel change in a data transmission process can be reduced. The user equipment can perform more accurate channel estimation according to the additional long training field, thereby reducing a bit error rate and improving data transmission reliability.

The foregoing and other operations and/or functions of the modules of the user equipment 20 are respectively used to implement corresponding procedures of the methods in FIG. 8 and FIG. 9. For brevity, details are not described herein repeatedly.

With reference to FIG. 20 to FIG. 24, the following describes in detail an access point 30 for information transmission provided in an embodiment of the present invention.

Figure 20:
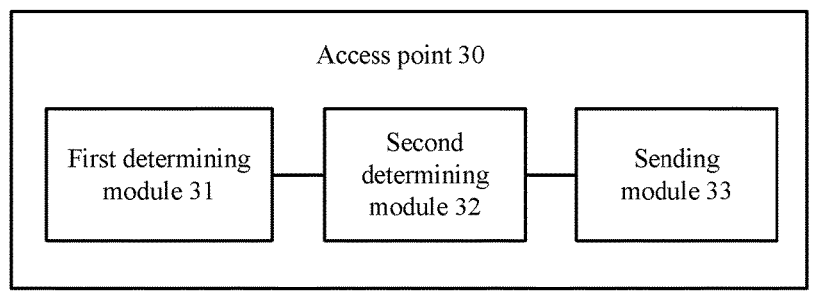
FIG. 20 is a schematic block diagram of an access point for information transmission according to another embodiment of the present invention.

FIG. 20 shows a schematic block diagram of an access point 30 for information transmission according to an embodiment of the present invention. As shown in FIG. 20, the access point 30 includes:

a first determining module 31, configured to determine a maximum orthogonal frequency division multiplexing OFDM symbol quantity of a frequency band used for uplink transmission, where the maximum OFDM symbol quantity of the frequency band is a maximum value of maximum OFDM symbol quantities of all subbands of the frequency band;

a second determining module 32, configured to determine, according to a value relationship between a maximum OFDM symbol quantity of a subband to which user equipment belongs and the maximum OFDM symbol quantity that is of the frequency band and is determined by the first determining module 31, additional long training field instruction information used to instruct the user equipment whether to send an additional long training field; and a sending module 33, configured to send an indication message to the user equipment, where the indication message includes the additional long training field instruction information determined by the second determining module 32.

Specifically, the first determining module 31 of the access point AP compares the maximum OFDM symbol quantities of all the subbands of the frequency band used for uplink transmission, to obtain the maximum OFDM symbol quantity corresponding to the frequency band, and then the second determining module 32 of the AP compares the value relationship between the maximum OFDM symbol quantity of the subband to which the user equipment belongs and the maximum OFDM symbol quantity of the frequency band, to determine the additional long training field instruction information, where the additional long training field instruction information is used to instruct the user equipment whether to send the additional long training field to the AP. Then, the AP sends, by using the sending module 33, the indication message that includes the additional long training field instruction information to the user equipment.

In conclusion, the access point in this embodiment of the present invention determines, according to a value relationship between a maximum OFDM symbol quantity of a subband to which user equipment belongs and a maximum OFDM symbol quantity of a frequency band used for uplink transmission, whether the user equipment needs to send an additional long training field. Therefore, when it is determined that the user equipment sends the additional long training field, zero padding overheads and a noise variance in a data transmission process can be reduced, and frequency band resource utilization can be improved. The AP can perform more accurate channel estimation according to the additional long training field, thereby reducing a bit error rate and improving data transmission reliability. In addition, a pilot in the additional long training field facilitates frequency offset estimation in a period of receiving a long training field sequence.

In this embodiment of the present invention, optionally, the first determining module 31 is specifically configured to determine, according to a frame length and a coding scheme of uplink transmission data, a quantity of spatial-temporal flows corresponding to each subband of the frequency band, and a quantity of data bits included in an OFDM symbol in each subband of the frequency band, the maximum OFDM symbol quantity of the frequency band used for uplink transmission.

Specifically, in this embodiment of the present invention, the second determining module 32 is specifically configured to: determine the additional long training field instruction information when the maximum OFDM symbol quantity of the subband to which the user equipment belongs is less than the maximum OFDM symbol quantity that is of the frequency band and is determined by the first determining module 31, where the additional long training field instruction information is used to instruct the user equipment to send the additional long training field to the AP; or determine the additional long training field instruction information when the maximum OFDM symbol quantity of the subband to which the user equipment belongs is equal to the maximum OFDM symbol quantity that is of the frequency band and is determined by the first determining module 31, where the additional long training field instruction information is used to instruct the user equipment not to send the additional long training field to the AP.

In this embodiment of the present invention, optionally, the sending module 33 is specifically configured to send a downlink scheduling frame that includes a signaling field to the user equipment, where the signaling field carries the indication message.

Figure 21:
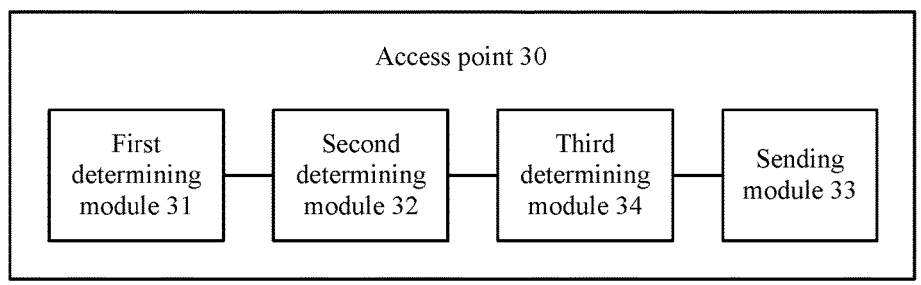
FIG. 21 is another schematic block diagram of an access point for information transmission according to another embodiment of the present invention.

In this embodiment of the present invention, optionally, as shown in FIG. 21, the access point 30 further includes: a third determining module 34, configured to determine a target quantity of OFDM symbols used by the user equipment for sending the additional long training field, where the target quantity of OFDM symbols is less than or equal to a difference between the maximum OFDM symbol quantity of the frequency band and the maximum OFDM symbol quantity of the subband to which the user equipment belongs.

Correspondingly, the additional long training field instruction information determined by the second determining module 32 includes the target quantity of OFDM symbols that is determined by the third determining module 34.

Figure 22:
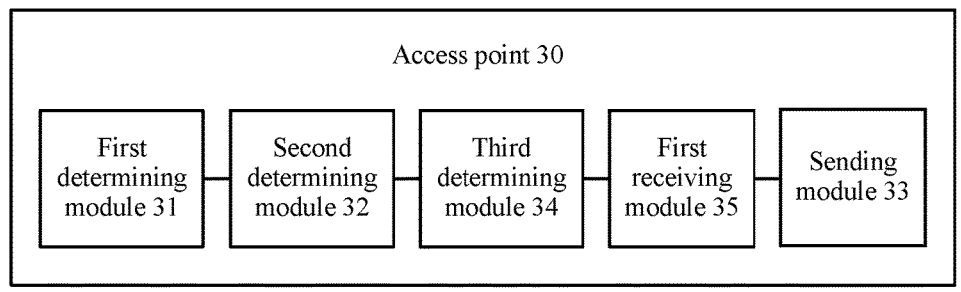
FIG. 22 is still another schematic block diagram of an access point for information transmission according to another embodiment of the present invention.

In this embodiment of the present invention, optionally, as shown in FIG. 22, the access point 30 further includes: a first receiving module 35, configured to receive an uplink data packet sent by the user equipment, where the uplink data packet includes an initial long training field, an additional long training field, and a data field that are arranged according to a sending time sequence. A sum of a quantity of OFDM symbols used by the user equipment for sending the initial long training field and a target quantity of OFDM symbols used for sending the additional long training field is less than or equal to a preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

Figure 23:
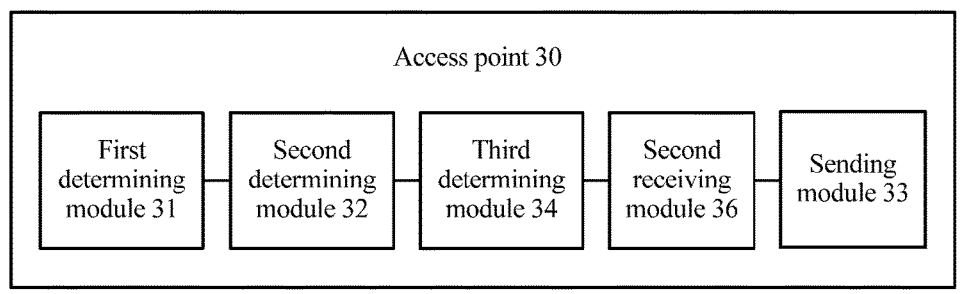
FIG. 23 is still another schematic block diagram of an access point for information transmission according to another embodiment of the present invention.

In this embodiment of the present invention, optionally, as shown in FIG. 23, the access point 30 further includes: a second receiving module 36, configured to receive an uplink data packet sent by the user equipment, where the uplink data packet includes the first additional long training field, the first data field, the second additional long training field, the second data field, . . . , the $i^{th}$ additional long training field, the $i^{th}$ data field, . . . , the $M^{th}$ additional long training field, and the $M^{th}$ data field that are arranged according to a sending time sequence, where 1≤i≤M, M is a natural number greater than 1, and i is a natural number.

The additional long training field includes the first additional long training field to the $M^{th}$ additional long training field, a sum of a quantity of OFDM symbols used by the user equipment for sending the first additional long training field and a quantity of OFDM symbols used for sending the initial long training field is less than or equal to a preset threshold, and a quantity of OFDM symbols used by the user equipment for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

It should be understood that, in this embodiment of the present invention, the uplink data packet may further include a signaling field and/or a short training field and/or another field that is supposed to be included according to a standard. This is not limited in the present invention.

In this embodiment of the present invention, optionally, a quantity of OFDM symbols used by the user equipment for sending any additional long training field of the M additional long training fields may be the same or different, and a quantity of OFDM symbols used by the user equipment for sending any data field of the M data fields may be the same or different. This is not limited in the present invention.

Figure 24:
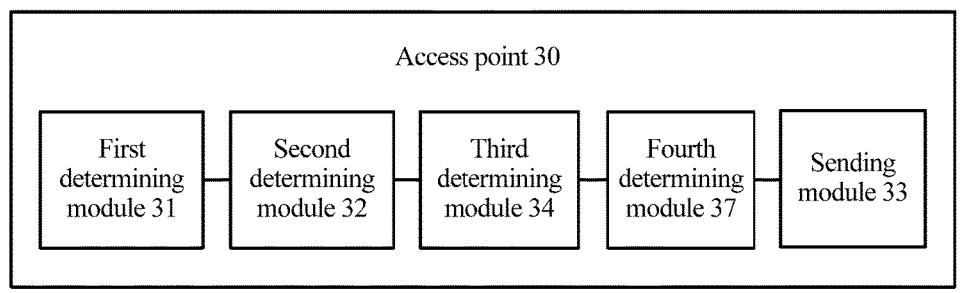
FIG. 24 is still another schematic block diagram of an access point for information transmission according to another embodiment of the present invention.

In this embodiment of the present invention, optionally, as shown in FIG. 24, the access point 30 further includes: a fourth determining module 37, configured to determine sending time sequence indication information used to indicate a sending time sequence of the additional long training field in the uplink data packet. Correspondingly, the indication message sent by the sending module 33 further includes the sending time sequence indication information determined by the fourth determining module 37.

In conclusion, the access point in this embodiment of the present invention determines, according to a value relationship between a maximum OFDM symbol quantity of a subband to which user equipment belongs and a maximum OFDM symbol quantity of a frequency band used for uplink transmission, whether the user equipment sends an additional long training field. Therefore, when it is determined that the user equipment sends the additional long training field, frequency band resource utilization can be improved, and zero padding overheads, a noise variance, and impact of a channel change in a data transmission process can be reduced. The AP can perform more accurate channel estimation according to the additional long training field, thereby reducing a bit error rate and improving data transmission reliability. In addition, a pilot in the additional long training field facilitates frequency offset estimation in a period of receiving a long training field sequence.

The foregoing and other operations and/or functions of the modules of the access point 30 are respectively used to implement corresponding procedures of the methods in FIG. 10 to FIG. 12. For brevity, details are not described herein repeatedly.

Figure 25:
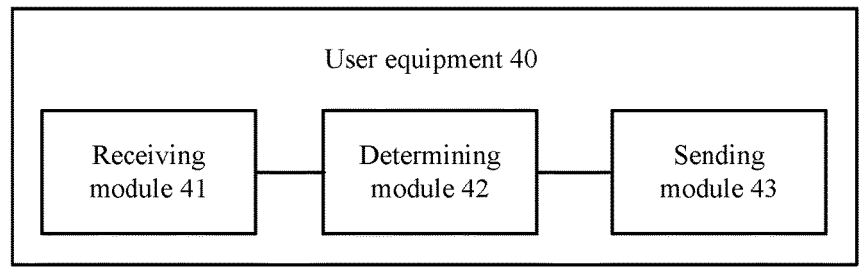
FIG. 25 is a schematic block diagram of user equipment for information transmission according to another embodiment of the present invention.
Figure 26:
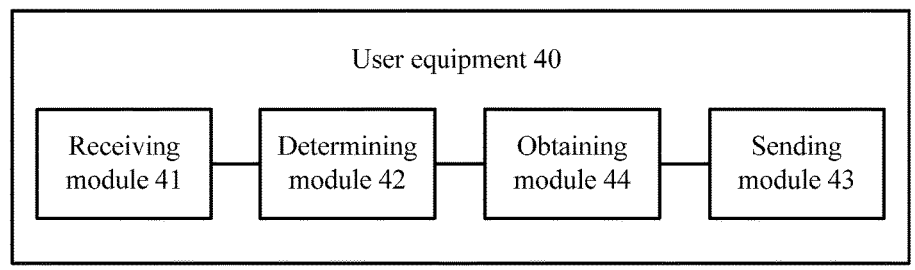
FIG. 26 is another schematic block diagram of user equipment for information transmission according to another embodiment of the present invention.

With reference to FIG. 25 and FIG. 26, the following describes in detail user equipment 40 for information transmission provided in an embodiment of the present invention.

FIG. 25 shows a schematic block diagram of user equipment 40 for information transmission according to an embodiment of the present invention. As shown in FIG. 25, the user equipment 40 includes:

a receiving module 41, configured to receive an indication message sent by an access point AP, where the indication message includes additional long training field instruction information, and the additional long training field instruction information is used to instruct whether to send an additional long training field;

a determining module 42, configured to: when the additional long training field instruction information included in the indication message received by the receiving module 41 instructs to send the additional long training field, determine a target quantity of OFDM symbols used for sending the additional long training field; and a sending module 43, configured to send the additional long training field and an initial long training field to the AP according to the target quantity of OFDM symbols that is determined by the determining module 42.

Specifically, the receiving module 41 of the user equipment receives the indication message that includes the additional long training field instruction information and is sent by the access point AP, where the additional long training field instruction information is used to instruct the user equipment whether to send the additional long training field to the AP. When the additional long training field instruction information included in the indication message received by the receiving module 41 instructs the user equipment to send the additional long training field, the determining module 42 of the user equipment determines the target quantity of OFDM symbols used for sending the additional long training field. Then, the sending module 43 of the user equipment sends the additional long training field and the initial long training field to the AP according to the target quantity of OFDM symbols.

In conclusion, the user equipment in this embodiment of the present invention determines, according to additional long training field instruction information in a received indication message, whether to send an additional long training field to an AP. Therefore, when the user equipment determines to send the additional long training field, frequency band resource utilization can be improved, and zero padding overheads and a noise variance in a data transmission process can be reduced. The AP can perform more accurate channel estimation by using the additional long training field, thereby reducing a bit error rate and improving data transmission reliability. In addition, a pilot in the additional long training field facilitates frequency offset estimation in a period of receiving a long training field sequence.

In this embodiment of the present invention, optionally, the receiving module 41 receives a downlink scheduling frame that includes a signaling field and is sent by the access point AP, where the signaling field carries the indication message.

In this embodiment of the present invention, optionally, the additional long training field instruction information included in the indication message received by the receiving module 41 includes a target quantity of OFDM symbols used by the user equipment for sending the additional long training field. Correspondingly, the determining module 42 is specifically configured to determine the target quantity that is of OFDM symbols used by the user equipment for sending the additional long training field and is included in the additional long training field instruction information as the target quantity of OFDM symbols used by the user equipment for sending the additional long training field.

In this embodiment of the present invention, optionally, as shown in FIG. 26, when the additional long training field instruction information included in the indication message received by the receiving module 41 instructs the user equipment to send the additional long training field, the user equipment 40 further includes: an obtaining module 44, configured to obtain a maximum OFDM symbol quantity of a frequency band used for uplink transmission and a maximum OFDM symbol quantity of a subband to which the user equipment belongs.

Correspondingly, the determining module 42 is specifically configured to determine, according to the maximum OFDM symbol quantity of the frequency band and the maximum OFDM symbol quantity of the subband to which the user equipment belongs that are obtained by the obtaining module 44, the target quantity of OFDM symbols used by the user equipment for sending the additional long training field, where the target quantity of OFDM symbols used by the user equipment for sending the additional long training field is less than or equal to a difference between the maximum OFDM symbol quantity of the frequency band and the maximum OFDM symbol quantity of the subband to which the user equipment belongs.

In this embodiment of the present invention, optionally, when the additional long training field instruction information included in the indication message received by the receiving module 41 instructs the user equipment to send the additional long training field, the obtaining module 44 is further configured to obtain a maximum quantity of OFDM symbols used by the user equipment for sending an initial long training field on the frequency band and a quantity of OFDM symbols used by the user equipment for sending an initial long training field on a subband.

Correspondingly, the determining module 42 is specifically configured to determine a difference between the maximum quantity of OFDM symbols used by the user equipment for sending the initial long training field on the frequency band and the quantity of OFDM symbols used by the user equipment for sending the initial long training field on the subband as the quantity of OFDM symbols used by the user equipment for sending the additional long training field.

In this embodiment of the present invention, optionally, the indication message received by the receiving module 41 further includes sending time sequence indication information, and the sending time sequence indication information is used to indicate a sending time sequence of the additional long training field in an uplink data packet. Correspondingly, the sending module 43 is specifically configured to send the additional long training field and the initial long training field to the AP according to the target quantity of OFDM symbols that is determined by the determining module 42 and the sending time sequence of the additional long training field in the uplink data packet.

In this embodiment of the present invention, optionally, the sending module 43 is further configured to send an uplink data packet to the AP, where the uplink data packet includes an initial long training field, an additional long training field, and a data field that are arranged according to a sending time sequence. A sum of a quantity of OFDM symbols used by the user equipment for sending the initial long training field and a target quantity of OFDM symbols used for sending the additional long training field is less than or equal to a preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

In this embodiment of the present invention, optionally, the sending module 43 is further configured to send an uplink data packet to the AP, where the uplink data packet includes the first additional long training field, the first data field, the second additional long training field, the second data field, . . . , the $i^{th}$ additional long training field, the $i^{th}$ data field, . . . , the $M^{th}$ additional long training field, and the $M^{th}$ data field that are arranged according to a sending time sequence, where $1 \leq i \leq M$, M is a natural number greater than 1, and i is a natural number.

The additional long training field includes the first additional long training field to the $M^{th}$ additional long training field, a sum of a quantity of OFDM symbols used by the user equipment for sending the first additional long training field and a quantity of OFDM symbols used for sending the initial long training field is less than or equal to a preset threshold, and a quantity of OFDM symbols used by the user equipment for sending any additional long training field of the second additional long training field to the $M^{th}$ additional long training field is greater than or equal to the quantity of OFDM symbols used for sending the initial long training field and is less than or equal to the preset threshold. The preset threshold may be a maximum value, stipulated in a standard, of a quantity of OFDM symbols that may be used for sending a long training field. For example, the preset threshold is 4 in the 802.11n standard and is 8 in the 802.11ac standard. Alternatively, the preset threshold may be any integer value that is greater than or equal to the quantity of OFDM symbols used for sending the initial long training field and is less than a maximum value, stipulated in a standard, of a quantity of OFDM symbols that may be used for sending a long training field. This is not limited in the present invention.

It should be understood that, in this embodiment of the present invention, the uplink data packet may further include a signaling field and/or a short training field and/or another field that is supposed to be included according to a standard. This is not limited in the present invention.

In conclusion, the user equipment in this embodiment of the present invention determines, according to additional long training field instruction information in a received indication message, whether to send an additional long training field. Therefore, when determining to send the additional long training field, the user equipment may divide the additional long training field into several parts for sending, so that frequency band resource utilization can be improved, and zero padding overheads, a noise variance, and impact of a channel change in a data transmission process can be reduced. An AP can perform more accurate channel estimation by using the additional long training field, thereby reducing a bit error rate and improving data transmission reliability. In addition, a pilot in the additional long training field facilitates frequency offset estimation in a period of receiving a long training field sequence.

The foregoing and other operations and/or functions of the modules of the user equipment 40 are respectively used to implement corresponding procedures of the methods in FIG. 13 and FIG. 14. For brevity, details are not described herein repeatedly.

Figure 27:
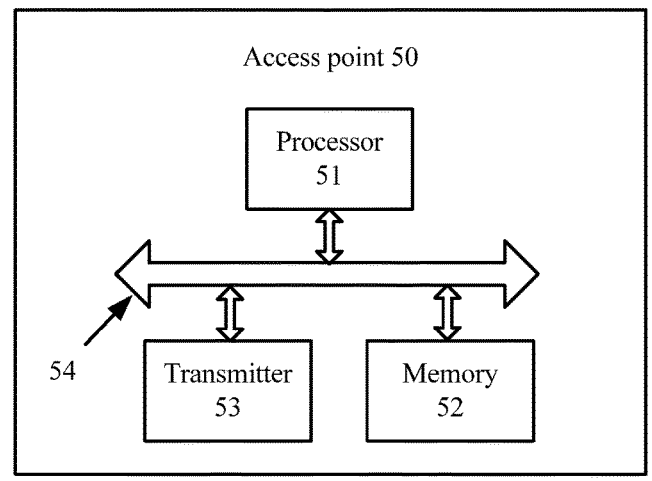
FIG. 27 is a schematic block diagram of an access point for information transmission according to still another embodiment of the present invention.

As shown in FIG. 27, an embodiment of the present invention further provides an access point 50 for information transmission. The access point includes a processor 51, a memory 52, a transmitter 53, and a bus system 54. The processor 51, the memory 52, and the transmitter 53 are connected by using the bus system 54, the memory 52 is configured to store an instruction, and the processor 51 is configured to execute the instruction stored in the memory 52, so as to control the transmitter 53 to send a signal. The processor 51 is configured to determine a maximum orthogonal frequency division multiplexing OFDM symbol quantity of a frequency band used for downlink transmission. The processor 51 is further configured to determine, according to a value relationship between a maximum OFDM symbol quantity of a subband to which user equipment belongs and the maximum OFDM symbol quantity of the frequency band, additional long training field instruction information used to instruct whether to send an additional long training field to the user equipment. The transmitter 53 is configured to send an indication message to the user equipment, where the indication message includes the additional long training field instruction information determined by the processor 51.

In conclusion, the access point in this embodiment of the present invention determines, according to a value relationship between a maximum OFDM symbol quantity of a subband to which user equipment belongs and a maximum OFDM symbol quantity of a frequency band used for downlink transmission, whether to send an additional long training field to the user equipment. Therefore, when the access point determines to send the additional long training field to the user equipment, zero padding overheads and a noise variance in a data transmission process can be reduced, and frequency band resource utilization can be improved. The user equipment can perform more accurate channel estimation according to the additional long training field, thereby reducing a bit error rate and improving data transmission reliability.

It should be understood that, in this embodiment of the present invention, the processor 51 may be a central processing unit (Central Processing Unit, "CPU" for short), or the processor 51 may be another general purpose processor, a digital signal processor (DSP), an application-specific integrated circuit (ASIC), a field programmable gate array (FPGA), another programmable logic device, a discrete gate or transistor logic device, a discrete hardware assembly, or the like. The general purpose processor may be a microprocessor, or the processor may be any normal processor, or the like.

The memory 52 may include a read-only memory and a random access memory, and provides an instruction and data to the processor 51. A part of the memory 52 may further include a nonvolatile random access memory. For example, the memory 52 may further store information about a device type.

In addition to a data bus, the bus system 54 may include a power bus, a control bus, a status signal bus, and the like. However, for clear description, various types of buses in the figure are marked as the bus system 54.

In an implementation process, the steps in the foregoing method may be completed by means of an integrated logic circuit of hardware in the processor 51 or an instruction in a form of software. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 52. The processor 51 reads information in the memory 52, and completes the steps of the foregoing method in combination with hardware of the processor 51. To avoid repetition, details are not described herein repeatedly.

Optionally, in an embodiment, the processor 51 is specifically configured to determine the additional long training field instruction information when the maximum OFDM symbol quantity of the subband to which the user equipment belongs is less than the maximum OFDM symbol quantity of the frequency band, where the additional long training field instruction information is used to instruct to send the additional long training field to the user equipment.

The transmitter 53 is specifically configured to: send the additional long training field and an initial long training field to the user equipment according to the additional long training field instruction information.

Alternatively, the processor 51 is specifically configured to determine the additional long training field instruction information when the maximum OFDM symbol quantity of the subband to which the user equipment belongs is equal to the maximum OFDM symbol quantity of the frequency band, where the additional long training field instruction information is used to instruct not to send the additional long training field to the user equipment.

Optionally, in an embodiment, the processor 51 is further configured to determine a target quantity of OFDM symbols used for sending the additional long training field to the user equipment, where the target quantity of OFDM symbols is less than or equal to a difference between the maximum OFDM symbol quantity of the frequency band and the maximum OFDM symbol quantity of the subband to which the user equipment belongs. The additional long training field instruction information determined by the processor 51 includes the target quantity of OFDM symbols.

Optionally, in an embodiment, the transmitter 53 is further configured to send a downlink data packet to the user equipment, where the downlink data packet includes an initial long training field, an additional long training field, and a data field that are arranged according to a sending time sequence, and a sum of a quantity of OFDM symbols used for sending the initial long training field and a target quantity of OFDM symbols used for sending the additional long training field is less than or equal to a preset threshold.

Optionally, in an embodiment, the transmitter 53 is further configured to send a downlink data packet to the user equipment, where the downlink data packet includes an initial long training field, the $i^{th}$ additional long training field, and the $i^{th}$ data field that are arranged according to a sending time sequence, the $i^{th}$ additional long training field and the $i^{th}$ data field are arranged alternately, $1 \leq i \leq M$, M is a natural number greater than 1, and i is a natural number.

The additional long training field includes the first additional long training field to the $M^{th}$ additional long training field, a sum of a quantity of OFDM symbols used for sending the first additional long training field and a quantity of OFDM symbols used for sending the initial long training field is less than or equal to a preset threshold, and a quantity of OFDM symbols used for sending any additional long training field of the second additional long training field to the $M^{th}$ additional long training field is greater than or equal to the quantity of OFDM symbols used for sending the initial long training field and is less than or equal to the preset threshold.

Optionally, in an embodiment, the processor 51 is further configured to determine sending time sequence indication information used to indicate a sending time sequence of the additional long training field in the downlink data packet. The indication message sent by the transmitter 53 includes the sending time sequence indication information.

Optionally, in an embodiment, the transmitter 53 is specifically configured to send the downlink data packet that includes a signaling field to the user equipment, where the signaling field carries the indication message.

Optionally, in an embodiment, the processor 51 is specifically configured to determine, according to a frame length and a coding scheme of downlink transmission data, a quantity of spatial-temporal flows corresponding to each subband of the frequency band, and a quantity of data bits included in an OFDM symbol in each subband of the frequency band, the maximum OFDM symbol quantity of the frequency band used for downlink transmission.

It should be understood that, the access point 50 in this embodiment of the present invention may be corresponding to the access point 10 provided in the embodiment of the present invention, and the foregoing and other operations and/or functions of the modules of the access point 50 are respectively used to implement corresponding procedures of the methods 100 in FIG. 1 to FIG. 3. For brevity, details are not described herein repeatedly.

In conclusion, the access point in this embodiment of the present invention determines, according to a value relationship between a maximum OFDM symbol quantity of a subband to which user equipment belongs and a maximum OFDM symbol quantity of a frequency band used for downlink transmission, whether to send an additional long training field to the user equipment. Therefore, when determining to send the additional long training field to the user equipment, the access point may divide the additional long training field into several parts for sending, so that frequency band resource utilization can be improved, and zero padding overheads, a noise variance, and impact of a channel change in a data transmission process can be reduced. The user equipment can perform more accurate channel estimation according to the additional long training field, thereby reducing a bit error rate and improving data transmission reliability.

Figure 28:
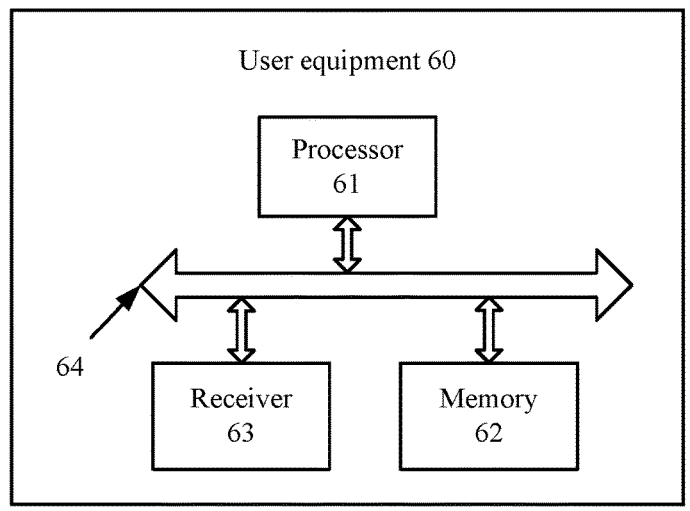
FIG. 28 is a schematic block diagram of user equipment for information transmission according to still another embodiment of the present invention.

As shown in FIG. 28, an embodiment of the present invention further provides user equipment 60 for information transmission. The access point includes a processor 61, a memory 62, a transmitter 63, and a bus system 64. The processor 61, the memory 62, and the receiver 63 are connected by using the bus system 64, the memory 62 is configured to store an instruction, and the processor 61 is configured to execute the instruction stored in the memory 62, so as to control the receiver 63 to receive a signal. The receiver 63 is configured to receive an indication message sent by an access point AP, where the indication message includes additional long training field instruction information, and the additional long training field instruction information is used to instruct the AP whether to send an additional long training field. The processor 61 is configured to: when the additional long training field instruction information instructs the AP to send the additional long training field, determine a target quantity of OFDM symbols used by the AP for sending the additional long training field. The receiver 63 is further configured to receive, according to the target quantity of OFDM symbols that is determined by the processor 61, the additional long training field and an initial long training field that are sent by the AP. The processor 61 is further configured to perform channel estimation according to the additional long training field and the initial long training field that are received by the receiver 63.

In conclusion, the user equipment in this embodiment of the present invention determines, according to additional long training field instruction information in a received indication message, whether an AP sends an additional long training field. Therefore, when it is determined that the AP sends the additional long training field, frequency band resource utilization can be improved, and zero padding overheads and a noise variance in a data transmission process can be reduced. The user equipment can perform more accurate channel estimation by using the additional long training field, thereby reducing a bit error rate and improving data transmission reliability.

Optionally, in an embodiment, the additional long training field instruction information included in the indication message received by the receiver 63 includes a target quantity of OFDM symbols used by the AP for sending the additional long training field. Correspondingly, the processor 61 is specifically configured to determine the target quantity that is of OFDM symbols used by the AP for sending the additional long training field and is included in the additional long training field instruction information as the target quantity of OFDM symbols used by the AP for sending the additional long training field.

Optionally, in an embodiment, when the additional long training field instruction information included in the indication message received by the receiver 63 instructs the AP to send the additional long training field, the receiver 63 is further configured to obtain a maximum OFDM symbol quantity of a frequency band used for downlink transmission and a maximum OFDM symbol quantity of a subband to which the user equipment belongs.

Correspondingly, the processor 63 is specifically configured to determine, according to the maximum OFDM symbol quantity of the frequency band and the maximum OFDM symbol quantity of the subband to which the user equipment belongs, the target quantity of OFDM symbols used by the AP for sending the additional long training field, where the target quantity of OFDM symbols used by the AP for sending the additional long training field is less than or equal to a difference between the maximum OFDM symbol quantity of the frequency band and the maximum OFDM symbol quantity of the subband to which the user equipment belongs.

Optionally, in an embodiment, the receiver 63 is further configured to receive a downlink data packet sent by the access point AP, where the downlink data packet includes an initial long training field, an additional long training field, and a data field that are arranged according to a sending time sequence, and a sum of a quantity of OFDM symbols used by the AP for sending the initial long training field and a target quantity of OFDM symbols used for sending the additional long training field is less than or equal to a preset threshold.

Optionally, in an embodiment, the receiver 63 is further configured to receive a downlink data packet sent by the access point AP, where the downlink data packet includes an initial long training field, the $i^{th}$ additional long training field, and the $i^{th}$ data field that are arranged according to a sending time sequence, the $i^{th}$ additional long training field and the $i^{th}$ data field are arranged alternately, $1 \leq i \leq M$, M is a natural number greater than 1, and i is a natural number.

The additional long training field includes the first additional long training field to the $M^{th}$ additional long training field, a sum of a quantity of OFDM symbols used by the AP for sending the first additional long training field and a quantity of OFDM symbols used for sending the initial long training field is less than or equal to a preset threshold, and a quantity of OFDM symbols used by the AP for sending any additional long training field of the second additional long training field to the $M^{th}$ additional long training field is greater than or equal to the quantity of OFDM symbols used for sending the initial long training field and is less than or equal to the preset threshold.

Optionally, in an embodiment, the indication message received by the receiver 63 further includes sending time sequence indication information, and the sending time sequence indication information is used to indicate a sending time sequence of the additional long training field in the downlink data packet.

The processor 61 is specifically configured to perform channel estimation according to the additional long training field received by the receiver 63, the initial long training field receiver by the receiver 63, and the sending time sequence of the additional long training field in the downlink data packet.

Optionally, in an embodiment, the receiver 63 is specifically configured to receive the downlink data packet that includes a signaling field and is sent by the access point AP, where the signaling field carries the indication message.

It should be understood that, the user equipment 60 in this embodiment of the present invention may be corresponding to the user equipment 20 provided in the embodiment of the present invention, and the foregoing and other operations and/or functions of the modules of the user equipment 20 are respectively used to implement corresponding procedures of the methods 200 in FIG. 8 and FIG. 9. For brevity, details are not described herein repeatedly.

In conclusion, the user equipment in this embodiment of the present invention determines, according to additional long training field instruction information in a received indication message, whether an AP sends an additional long training field. Therefore, when it is determined that the AP sends the additional long training field, frequency band resource utilization can be improved, and zero padding overheads, a noise variance, and impact of a channel change in a data transmission process can be reduced. The user equipment can perform more accurate channel estimation according to the additional long training field, thereby reducing a bit error rate and improving data transmission reliability.

Figure 29:
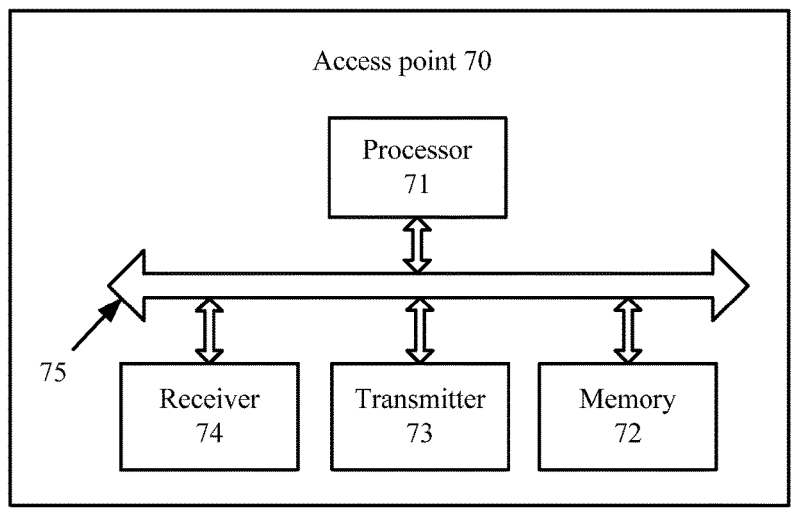
FIG. 29 is a schematic block diagram of an access point for information transmission according to still another embodiment of the present invention.

As shown in FIG. 29, an embodiment of the present invention further provides an access point 70 for information transmission. The access point includes a processor 71, a memory 72, a transmitter 73, a receiver 74, and a bus system 75. The processor 71, the memory 72, the transmitter 73, and the receiver 74 are connected by using the bus system 75, the memory 72 is configured to store an instruction, and the processor 71 is configured to execute the instruction stored in the memory 72, so as to control the transmitter 73 to send a signal and the receiver 74 to receive a signal. The processor 71 is configured to determine a maximum orthogonal frequency division multiplexing OFDM symbol quantity of a frequency band used for uplink transmission. The processor 71 is further configured to determine, according to a value relationship between a maximum OFDM symbol quantity of a subband to which user equipment belongs and the maximum OFDM symbol quantity of the frequency band, additional long training field instruction information used to instruct the user equipment whether to send an additional long training field to the AP. The transmitter 73 is configured to send an indication message to the user equipment, where the indication message includes the additional long training field instruction information determined by the processor 71.

In conclusion, the access point in this embodiment of the present invention determines, according to a value relationship between a maximum OFDM symbol quantity of a subband to which user equipment belongs and a maximum OFDM symbol quantity of a frequency band used for uplink transmission, whether the user equipment sends an additional long training field. Therefore, when it is determined that the user equipment sends the additional long training field, frequency band resource utilization can be improved, and zero padding overheads and a noise variance in a data transmission process can be reduced. The AP can perform more accurate channel estimation according to the additional long training field, thereby reducing a bit error rate and improving data transmission reliability. In addition, a pilot in the additional long training field facilitates frequency offset estimation in a period of receiving a long training field sequence.

Optionally, in an embodiment, the processor 71 is specifically configured to: determine the additional long training field instruction information when the maximum OFDM symbol quantity of the subband to which the user equipment belongs is less than the maximum OFDM symbol quantity of the frequency band, where the additional long training field instruction information is used to instruct the user equipment to send the additional long training field; or determine the additional long training field instruction information when the maximum OFDM symbol quantity of the subband to which the user equipment belongs is equal to the maximum OFDM symbol quantity of the frequency band, where the additional long training field instruction information is used to instruct the user equipment not to send the additional long training field.

Optionally, in an embodiment, the processor 71 is further configured to determine a target quantity of OFDM symbols used by the user equipment for sending the additional long training field, where the target quantity of OFDM symbols is less than or equal to a difference between the maximum OFDM symbol quantity of the frequency band and the maximum OFDM symbol quantity of the subband to which the user equipment belongs. The additional long training field instruction information determined by the processor 71 includes the target quantity of OFDM symbols.

Optionally, in an embodiment, the receiver 74 is configured to receive an uplink data packet sent by the user equipment, where the uplink data packet includes an initial long training field, an additional long training field, and a data field that are arranged according to a sending time sequence, and a sum of a quantity of OFDM symbols used by the user equipment for sending the initial long training field and a target quantity of OFDM symbols used for sending the additional long training field is less than or equal to a preset threshold.

Optionally, in an embodiment, the receiver 74 is configured to receive an uplink data packet sent by the user equipment, where the uplink data packet includes an initial long training field, the $i^{th}$ additional long training field, and the $i^{th}$ data field that are arranged according to a sending time sequence, the $i^{th}$ additional long training field and the $i^{th}$ data field are arranged alternately, $1 \leq i \leq M$, M is a natural number greater than 1, and i is a natural number.

The additional long training field includes the first additional long training field to the $M^{th}$ additional long training field, a sum of a quantity of OFDM symbols used by the user equipment for sending the first additional long training field and a quantity of OFDM symbols used for sending the initial long training field is less than or equal to a preset threshold, and a quantity of OFDM symbols used by the user equipment for sending any additional long training field of the second additional long training field to the $M^{th}$ additional long training field is greater than or equal to the quantity of OFDM symbols used for sending the initial long training field and is less than or equal to the preset threshold.

Optionally, in an embodiment, the processor 71 is further configured to determine sending time sequence indication information used to indicate a sending time sequence of the additional long training field in the uplink data packet. The indication message sent by the transmitter 73 includes the sending time sequence indication information.

Optionally, in an embodiment, the transmitter 73 is specifically configured to send a downlink scheduling frame that includes a signaling field to the user equipment, where the signaling field carries the indication message.

Optionally, in an embodiment, the processor 71 is specifically configured to determine, according to a frame length and a coding scheme of uplink transmission data, a quantity of spatial-temporal flows corresponding to each subband of the frequency band, and a quantity of data bits included in an OFDM symbol in each subband of the frequency band, the maximum OFDM symbol quantity of the frequency band used for uplink transmission.

It should be understood that, the access point 70 in this embodiment of the present invention may be corresponding to the access point 30 provided in the embodiment of the present invention, and the foregoing and other operations and/or functions of the modules of the access point 70 are respectively used to implement corresponding procedures of the methods 300 in FIG. 10 to FIG. 12. For brevity, details are not described herein repeatedly.

In conclusion, the access point in this embodiment of the present invention determines, according to a value relationship between a maximum OFDM symbol quantity of a subband to which user equipment belongs and a maximum OFDM symbol quantity of a frequency band used for uplink transmission, whether the user equipment sends an additional long training field. Therefore, when it is determined that the user equipment sends the additional long training field, frequency band resource utilization can be improved, and zero padding overheads and a noise variance in a data transmission process can be reduced. The AP can perform more accurate channel estimation according to the additional long training field, thereby reducing a bit error rate and improving data transmission reliability. In addition, a pilot in the additional long training field facilitates frequency offset estimation in a period of receiving a long training field sequence.

Figure 30:
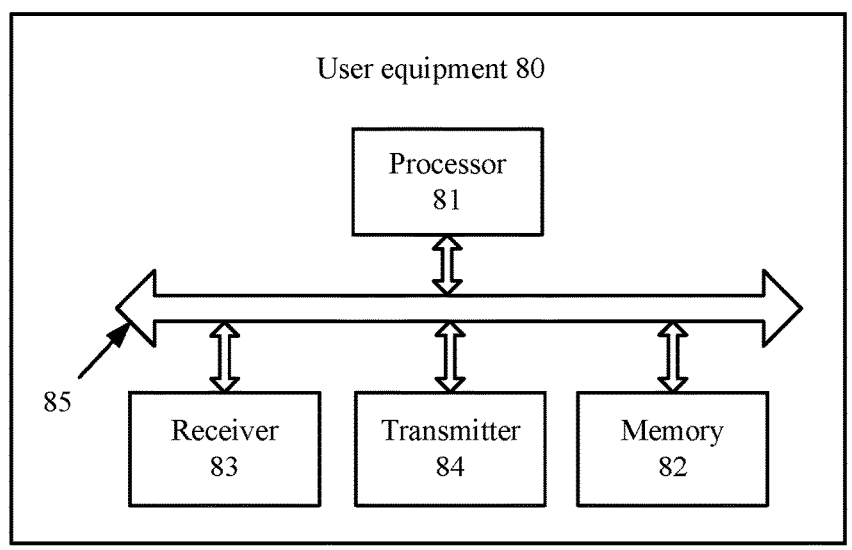
FIG. 30 is a schematic block diagram of user equipment for information transmission according to still another embodiment of the present invention.

As shown in FIG. 30, an embodiment of the present invention further provides user equipment 80 for information transmission. The access point includes a processor 81, a memory 82, a receiver 83, a transmitter 84, and a bus system 85. The processor 81, the memory 82, the receiver 83, and the transmitter 84 are connected by using the bus system 85, the memory 82 is configured to store an instruction, and the processor 81 is configured to execute the instruction stored by the memory 82, so as to control the receiver 83 to receive a signal and the transmitter 84 to send a signal. The receiver 83 is configured to receive an indication message sent by an access point AP, where the indication message includes additional long training field instruction information, and the additional long training field instruction information is used to instruct the user equipment whether to send an additional long training field. The processor 81 is configured to: when the additional long training field instruction information instructs to send the additional long training field, determine a target quantity of OFDM symbols used by the user equipment for sending the additional long training field. The transmitter 84 is configured to send the additional long training field and an initial long training field to the AP according to the target quantity of OFDM symbols that is determined by the processor 81.

In conclusion, the user equipment for information transmission in this embodiment of the present invention determines, according to additional long training field instruction information in a received indication message, whether to send an additional long training field. Therefore, when the user equipment determines to send the additional long training field, frequency band resource utilization can be improved, and zero padding overheads and a noise variance in a data transmission process can be reduced. An AP can perform more accurate channel estimation by using the additional long training field, thereby reducing a bit error rate and improving data transmission reliability. In addition, a pilot in the additional long training field facilitates frequency offset estimation in a period of receiving a long training field sequence.

Optionally, in an embodiment, the additional long training field instruction information included in the indication message received by the receiver 83 includes a target quantity of OFDM symbols used for sending the additional long training field. Correspondingly, the processor 81 is specifically configured to determine the target quantity that is of OFDM symbols used for sending the additional long training field and is included in the additional long training field instruction information as the target quantity of OFDM symbols used for sending the additional long training field.

Optionally, in an embodiment, when the additional long training field instruction information included in the indication message received by the receiver 83 instructs to send the additional long training field, the receiver 83 is further configured to obtain a maximum OFDM symbol quantity of a frequency band used for uplink transmission and a maximum OFDM symbol quantity of a subband to which the user equipment belongs.

Correspondingly, the processor 83 is specifically configured to determine, according to the maximum OFDM symbol quantity of the frequency band and the maximum OFDM symbol quantity of the subband to which the user equipment belongs, the target quantity of OFDM symbols used for sending the additional long training field, where the target quantity of OFDM symbols used for sending the additional long training field is less than or equal to a difference between the maximum OFDM symbol quantity of the frequency band and the maximum OFDM symbol quantity of the subband to which the user equipment belongs.

Optionally, in an embodiment, the transmitter 84 is further configured to send an uplink data packet to the AP, where the uplink data packet includes an initial long training field, an additional long training field, and a data field that are arranged according to a sending time sequence, and a sum of a quantity of OFDM symbols used for sending the initial long training field and a target quantity of OFDM symbols used for sending the additional long training field is less than or equal to a preset threshold.

Optionally, in an embodiment, the transmitter 84 is further configured to send an uplink data packet to the AP, where the uplink data packet includes an initial long training field, the $i^{th}$ additional long training field, and the $i^{th}$ data field that are arranged according to a sending time sequence, the $i^{th}$ additional long training field and the $i^{th}$ data field are arranged alternately, $1 \leq i \leq M$, M is a natural number greater than 1, and i is a natural number.

The additional long training field includes the first additional long training field to the $M^{th}$ additional long training field, a sum of a quantity of OFDM symbols used for sending the first additional long training field and a quantity of OFDM symbols used for sending the initial long training field is less than or equal to a preset threshold, and a quantity of OFDM symbols used for sending any additional long training field of the second additional long training field to the $M^{th}$ additional long training field is greater than or equal to the quantity of OFDM symbols used for sending the initial long training field and is less than or equal to the preset threshold.

Optionally, in an embodiment, the indication message received by the receiver 83 further includes sending time sequence indication information, and the sending time sequence indication information is used to indicate a sending time sequence of the additional long training field in the uplink data packet. The transmitter 84 is specifically configured to send the additional long training field and the initial long training field to the AP according to the target quantity of OFDM symbols that is determined by the processor 81 and the sending time sequence of the additional long training field in the uplink data packet.

Optionally, in an embodiment, the receiver 83 is specifically configured to receive a downlink scheduling frame that includes a signaling field and is sent by the access point AP, where the signaling field carries the indication message.

It should be understood that, the user equipment 80 in this embodiment of the present invention may be corresponding to the user equipment 40 provided in the embodiment of the present invention, and the foregoing and other operations and/or functions of the modules of the user equipment 80 are respectively used to implement corresponding procedures of the methods 400 in FIG. 13 and FIG. 14. For brevity, details are not described herein repeatedly.

In conclusion, the user equipment for information transmission in this embodiment of the present invention determines, according to additional long training field instruction information in a received indication message, whether to send an additional long training field. Therefore, when determining to send the additional long training field, the user equipment may divide the additional long training field into several parts for sending, so that frequency band resource utilization can be improved, and zero padding overheads, a noise variance, and impact of a channel change in a data transmission process can be reduced. An AP can perform more accurate channel estimation by using the additional long training field, thereby reducing a bit error rate and improving data transmission reliability. In addition, a pilot in the additional long training field facilitates frequency offset estimation in a period of receiving a long training field sequence.

It should be noted that, "one embodiment" or "an embodiment" mentioned throughout the specification means that specific features, structures, or characteristics related to the embodiment are included in at least one embodiment of the present invention. Therefore, "in one embodiment" or "in an embodiment" throughout the specification does not necessarily refer to a same embodiment. In addition, these specific features, structures, or characteristics may be combined in one or more embodiments in any proper manner.

It should be understood that, sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, "B corresponding to A" indicates that B is associated with A, and B may be determined according to A. However, it should further be understood that, determining A according to B does not mean that B is determined according to A only, that is, B may be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that, the disclosed system, apparatus, and method may be implemented in another manner. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to an actual requirement to achieve the objectives of the solutions of the embodiments.

In addition, functional units in the embodiments of the present invention may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of information transmission, comprising:
determining a maximum orthogonal frequency division multiplexing (OFDM) symbol quantity of a frequency band used for downlink transmission, wherein the maximum OFDM symbol quantity of the frequency band is a maximum value of maximum OFDM symbol quantities of all subbands of the frequency band;
determining, according to a value relationship between a maximum OFDM symbol quantity of a subband to which user equipment belongs and the maximum OFDM symbol quantity of the frequency band, additional long training field instruction information used to instruct whether to send an additional long training field to the user equipment; and
sending an indication message to the user equipment, wherein the indication message comprises the additional long training field instruction information, wherein the determining additional long training field instruction information used to instruct whether to send an additional long training field to the user equipment comprises:
determining the additional long training field instruction information when the maximum OFDM symbol quantity of the subband to which the user equipment belongs is less than the maximum OFDM symbol quantity of the frequency band, wherein the additional long training field instruction information is used to instruct to send the additional long training field to the user equipment; wherein the method further comprises:
sending the additional long training field and an initial long training field to the user equipment according to the additional long training field instruction information; or
determining the additional long training field instruction information when the maximum OFDM symbol quantity of the subband to which the user equipment belongs is equal to the maximum OFDM symbol quantity of the frequency band, wherein the additional long training field instruction information is used to instruct not to send the additional long training field to the user equipment.

2. A method of information transmission, comprising:
determining a maximum orthogonal frequency division multiplexing (OFDM) symbol quantity of a frequency band used for downlink transmission, wherein the maximum OFDM symbol quantity of the frequency band is a maximum value of maximum OFDM symbol quantities of all subbands of the frequency band;
determining, according to a value relationship between a maximum OFDM symbol quantity of a subband to which user equipment belongs and the maximum OFDM symbol quantity of the frequency band, additional long training field instruction information used to instruct whether to send an additional long training field to the user equipment;
sending an indication message to the user equipment, wherein the indication message comprises the additional long training field instruction information; and
determining a target quantity of OFDM symbols used for sending the additional long training field to the user equipment, wherein the target quantity of OFDM symbols is less than or equal to a difference between the maximum OFDM symbol quantity of the frequency band and the maximum OFDM symbol quantity of the subband to which the user equipment belongs; wherein
the additional long training field instruction information comprises the target quantity of OFDM symbols.

3. An access point, comprising:
a memory to store instructions; and
a processor to execute the instructions to implement:
  a first determining module, configured to determine a maximum orthogonal frequency division multiplexing (OFDM) symbol quantity of a frequency band used for downlink transmission, wherein the maximum OFDM symbol quantity of the frequency band is a maximum value of maximum OFDM symbol quantities of all subbands of the frequency band;
  a second determining module, configured to determine, according to a value relationship between a maximum OFDM symbol quantity of a subband to which user equipment belongs and the maximum OFDM symbol quantity that is of the frequency band and is determined by the first determining module, additional long training field instruction information used to instruct whether to send an additional long training field to the user equipment; and
  a sending module, configured to send an indication message to the user equipment, wherein the indication message comprises the additional long training field instruction information determined by the second determining module, wherein the second determining module is configured to:
determine the additional long training field instruction information when the maximum OFDM symbol quantity of the subband to which the user equipment belongs is less than the maximum OFDM symbol quantity that is of the frequency band and is determined by the first determining module, wherein the additional long training field instruction information is used to instruct to send the additional long training field to the user equipment; wherein
the sending module is configured to:
send the additional long training field and an initial long training field to the user equipment according to the additional long training field instruction information; or
determine the additional long training field instruction information when the maximum OFDM symbol quantity of the subband to which the user equipment belongs is equal to the maximum OFDM symbol quantity that is of the frequency band and is determined by the first determining module, wherein the additional long training field instruction information is used to instruct not to send the additional long training field to the user equipment.

4. An access point, comprising:
a memory to store instructions; and
a processor to execute the instructions to implement:
  a first determining module, configured to determine a maximum orthogonal frequency division multiplexing (OFDM) symbol quantity of a frequency band used for downlink transmission, wherein the maximum OFDM symbol quantity of the frequency band is a maximum value of maximum OFDM symbol quantities of all subbands of the frequency band;
  a second determining module, configured to determine, according to a value relationship between a maximum OFDM symbol quantity of a subband to which user equipment belongs and the maximum OFDM symbol quantity that is of the frequency band and is determined by the first determining module, additional long training field instruction information used to instruct whether to send an additional long training field to the user equipment;
  a sending module, configured to send an indication message to the user equipment, wherein the indication message comprises the additional long training field instruction information determined by the second determining module; and
  a third determining module, configured to determine a target quantity of OFDM symbols used for sending the additional long training field to the user equipment, wherein the target quantity of OFDM symbols is less than or equal to a difference between the maximum OFDM symbol quantity of the frequency band and the maximum OFDM symbol quantity of the subband to which the user equipment belongs; wherein
the additional long training field instruction information determined by the second determining module comprises the target quantity of OFDM symbols that is determined by the third determining module.

* * * * *